(12) United States Patent
Mirzahasanloo et al.

(10) Patent No.: US 10,559,315 B2
(45) Date of Patent: Feb. 11, 2020

(54) EXTENDED-RANGE COARSE-FINE QUANTIZATION FOR AUDIO CODING

(71) Applicant: QUALCOMM Incorporated, San Diego, CA (US)

(72) Inventors: Taher Shahbazi Mirzahasanloo, San Diego, CA (US); Rogerio Guedes Alves, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/045,496

(22) Filed: Jul. 25, 2018

(65) Prior Publication Data

US 2019/0304475 A1 Oct. 3, 2019

Related U.S. Application Data

(60) Provisional application No. 62/649,105, filed on Mar. 28, 2018.

(51) Int. Cl.
| | |
|---|---|
| *G10L 19/00* | (2013.01) |
| *G10L 19/035* | (2013.01) |
| *G10L 19/02* | (2013.01) |
| *H04W 72/04* | (2009.01) |

(Continued)

(52) U.S. Cl.
CPC .......... *G10L 19/035* (2013.01); *G10L 19/002* (2013.01); *G10L 19/0204* (2013.01); *H04W 72/0453* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 7,373,293 | B2 * | 5/2008 | Chang | G10L 19/032 704/200.1 |
| 8,037,114 | B2 * | 10/2011 | Gayer | G06F 7/49942 708/200 |
| 8,090,587 | B2 | 1/2012 | Jung et al. | |

(Continued)

OTHER PUBLICATIONS

"Bluetooth Core Specification v 5.0," published Dec. 6, 2016 accessed from https://www.bluetooth.com/specifications, 5 pp.

(Continued)

*Primary Examiner* — Satwant K Singh
(74) *Attorney, Agent, or Firm* — Shumaker & Sieffert, P.A.

(57) ABSTRACT

A method of encoding audio data includes determining an energy level of a first subband of frequency domain audio data, determining a bit allocation for a coarse quantization process and a fine quantization process, determining that the energy level of the first subband of frequency domain audio data is outside a predetermined range of energy levels for the coarse quantization process, reallocating bits assigned to the fine quantization process to an extended-range coarse quantization process, the extended-range coarse quantization process using an extended range of energy levels, wherein the extended range of energy levels is larger than the predetermined range of energy levels for the coarse quantization process, and quantizing the energy level of the first subband of frequency domain audio data using the extended-range coarse quantization process to produce a quantized extended-range coarse energy level.

28 Claims, 15 Drawing Sheets

(51) Int. Cl.
*G10L 19/002* (2013.01)
*H04W 84/18* (2009.01)

(56) References Cited

U.S. PATENT DOCUMENTS

| | | | | |
|---|---|---|---|---|
| 8,731,949 | B2* | 5/2014 | Jiang | H03M 7/3082 |
| | | | | 704/226 |
| 9,280,980 | B2* | 3/2016 | Grancharov | G10L 19/0204 |
| 9,385,750 | B2 | 7/2016 | Norvell et al. | |
| 9,508,356 | B2 | 11/2016 | Yamanashi et al. | |
| 9,672,837 | B2 | 6/2017 | Purnhagen et al. | |
| 9,767,815 | B2 | 9/2017 | Liu et al. | |
| 2018/0190303 | A1* | 7/2018 | Ghido | G10L 19/008 |
| 2018/0211676 | A1* | 7/2018 | Zernicki | G10L 19/008 |

OTHER PUBLICATIONS

"Advanced Audio Distribution Profile Specification," version 1.3.1, published Jul. 14, 2015, 35 pp.

\* cited by examiner

EXTENDED-RANGE COARSE-FINE QUANTIZATION FOR AUDIO CODING

This application claims the benefit of U.S. Provisional Application No. 62/649,105, filed Mar. 28, 2018, the entire content of which is incorporated by reference herein.

TECHNICAL FIELD

This disclosure relates to audio encoding and decoding.

BACKGROUND

Wireless networks for short-range communication, which may be referred to as "personal area networks," are established to facilitate communication between a source device and a sink device. One example of a personal area network (PAN) protocol is Bluetooth®, which is often used to form a PAN for streaming audio data from the source device (e.g., a mobile phone) to the sink device (e.g., headphones or a speaker).

In some examples, the Bluetooth® protocol is used for streaming encoded or otherwise compressed audio data. In some examples, audio data is encoded using gain-shape vector quantization audio encoding techniques. In gain-shape vector quantization audio encoding, audio data is transformed into the frequency domain and then separated into subbands of transform coefficients. A scalar energy level (e.g., gain) of each subband is encoded separately from the shape (e.g., a residual vector of transform coefficients) of the subband.

SUMMARY

In general, this disclosure relates to techniques for performing extended-range fine-coarse quantization on a scalar energy level of a subband of frequency domain audio data. In some examples, the energy level of a subband is quantized in a two-step process. First, a certain number of bits are allocated for performing a coarse quantization process. The coarse quantization process is performed within a predetermined range of energy values (e.g., defined by maximum and minimum energy values). The quantized coarse energy is compared to the original energy of the subband and an error is computed. Then, using another number of bits, a fine quantization process is performed on the error to produce quantized fine energy. Together, the quantized coarse energy and the quantized fine energy represent the total energy level of the subband.

In some examples, the energy level of a subband may be outside of the predetermined range of energy levels for performing coarse quantization. In accordance with the techniques of this disclosure, an audio encoder may be configured to determine when the energy level of a subband is outside the predetermined range of energy levels for coarse quantization. If so, the audio encoder may reallocate bits assigned to the fine quantization process to an extended-range coarse quantization process. The extended-range coarse quantization process may be performed with an extended range of energy values in order to more accurately encode the energy level of the subband. The techniques of this disclosure may be used when quantizing the energy levels of one or more subbands of a frame of audio. That is, in some examples, the techniques of this disclosure may be used for a subset of subbands of a frame of audio data. In other examples, the techniques of this disclosure may be used with every subband of frame of audio data.

In this respect, the techniques may include a method of encoding audio data, the method comprising determining an energy level of a first subband of frequency domain audio data, determining a bit allocation for a coarse quantization process and a fine quantization process, determining that the energy level of the first subband of frequency domain audio data is outside a predetermined range of energy levels for the coarse quantization process, reallocating bits assigned to the fine quantization process to an extended-range coarse quantization process, the extended-range coarse quantization process using an extended range of energy levels, wherein the extended range of energy levels is larger than the predetermined range of energy levels for the coarse quantization process, and quantizing the energy level of the first subband of frequency domain audio data using the extended-range coarse quantization process to produce a quantized extended-range coarse energy level.

In another aspect, this disclosure describes an apparatus configured to encode audio data, the apparatus comprising a memory configured to store the audio data, and one or more processors in communication with the memory, the one or more processors configured to determine an energy level of a first subband of frequency domain audio data, determine a bit allocation for a coarse quantization process and a fine quantization process, determine that the energy level of the first subband of frequency domain audio data is outside a predetermined range of energy levels for the coarse quantization process, reallocate bits assigned to the fine quantization process to an extended-range coarse quantization process, the extended-range coarse quantization process using an extended range of energy levels, wherein the extended range of energy levels is larger than the predetermined range of energy levels for the coarse quantization process, and quantize the energy level of the first subband of frequency domain audio data using the extended-range coarse quantization process to produce a quantized extended-range coarse energy level.

In another aspect, this disclosure describes a method for decoding audio data comprising receiving a quantized coarse energy level for a subband of frequency domain audio data, receiving a syntax element that indicates if the quantized coarse energy level was quantized using an extended-range coarse quantization process, determining a scaling factor for performing an inverse quantization process based on the syntax element, and performing inverse quantization on the quantized coarse energy level with the determined scaling factor.

In another aspect, this disclosure describes an apparatus configured to decode audio data, the apparatus comprising a memory configured to store the audio data, and one or more processors in communication with the memory, the one or more processors configured to receive a quantized coarse energy level for a subband of frequency domain audio data, receive a syntax element that indicates if the quantized coarse energy level was quantized using an extended-range coarse quantization process, determine a scaling factor for performing an inverse quantization process based on the syntax element, and perform inverse quantization on the quantized coarse energy level with the determined scaling factor.

The details of one or more aspects of the techniques are set forth in the accompanying drawings and the description below. Other features, objects, and advantages of these techniques will be apparent from the description and drawings, and from the claims.

DETAILED DESCRIPTION

Figure 1:
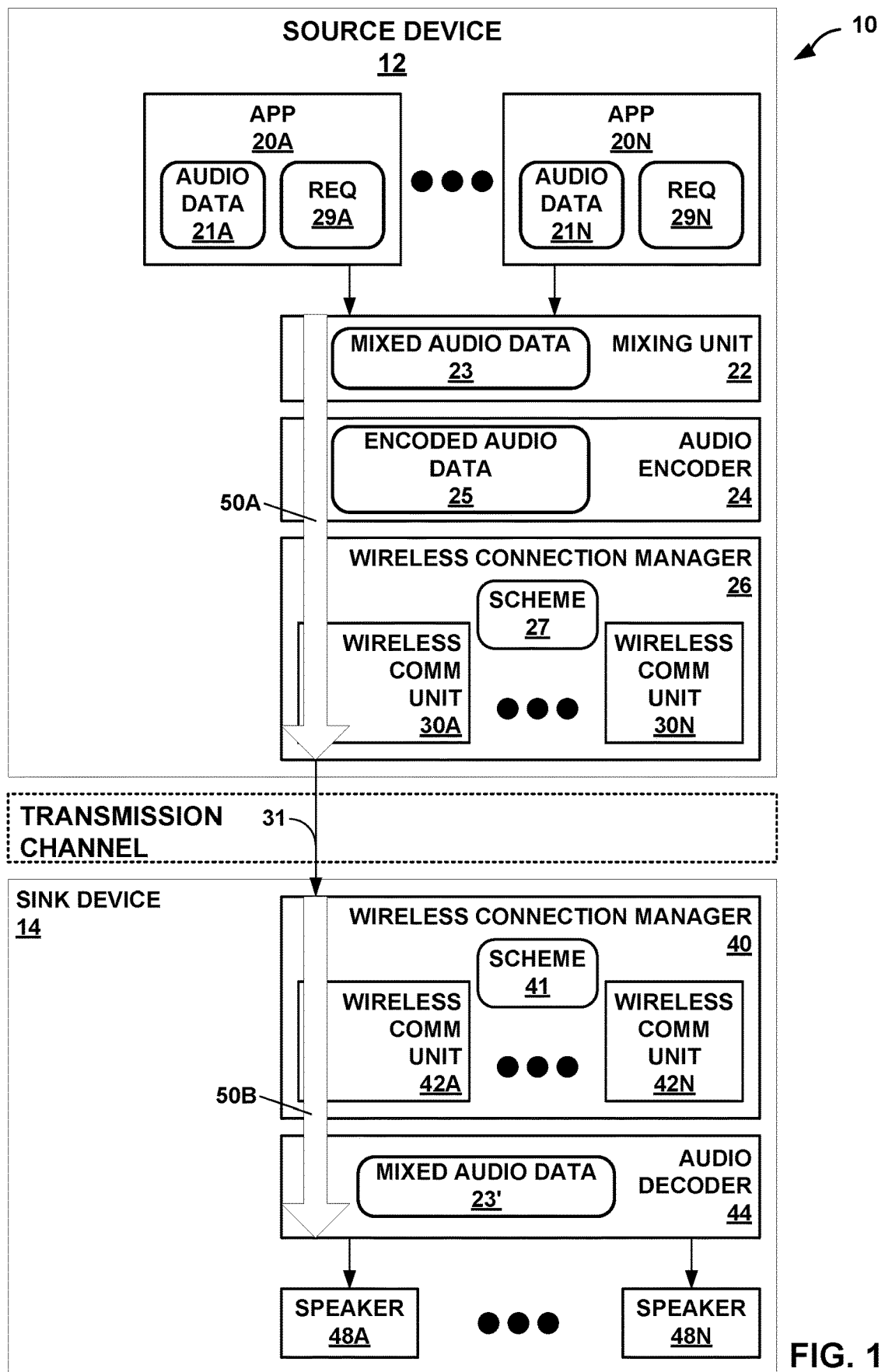
FIG. 1 is a block diagram illustrating a system that may perform various aspects of the techniques described in this disclosure.

FIG. 1 is a diagram illustrating a system 10 that may perform various aspects of the techniques described in this disclosure for extended-range coarse-fine quantization of audio data. As shown in the example of FIG. 1, the system 10 includes a source device 12 and a sink device 14. Although described with respect to the source device 12 and the sink device 14, the source device 12 may operate, in some instances, as the sink device, and the sink device 14 may, in these and other instances, operate as the source device. As such, the example of system 10 shown in FIG. 1 is merely one example illustrative of various aspects of the techniques described in this disclosure.

In any event, the source device 12 may represent any form of computing device capable of implementing the techniques described in this disclosure, including a handset (or cellular phone), a tablet computer, a so-called smart phone, a remotely piloted aircraft (such as a so-called "drone"), a robot, a desktop computer, a receiver (such as an audio/visual—AV—receiver), a set-top box, a television (including so-called "smart televisions"), a media player (such as s digital video disc player, a streaming media player, a Blue-Ray Disc™ player, etc.), or any other device capable of communicating audio data wirelessly to a sink device via a personal area network (PAN). For purposes of illustration, the source device 12 is assumed to represent a smart phone.

The sink device 14 may represent any form of computing device capable of implementing the techniques described in this disclosure, including a handset (or cellular phone), a tablet computer, a smart phone, a desktop computer, a wireless headset (which may include wireless headphones that include or exclude a microphone, and so-called smart wireless headphones that include additional functionality such as fitness monitoring, on-board music storage and/or playback, dedicated cellular capabilities, etc.), a wireless speaker (including a so-called "smart speaker"), a watch (including so-called "smart watches"), or any other device capable of reproducing a soundfield based on audio data communicated wirelessly via the PAN. Also, for purposes of illustration, the sink device 14 is assumed to represent wireless headphones.

As shown in the example of FIG. 1, the source device 12 includes one or more applications ("apps") 20A-20N ("apps 20"), a mixing unit 22, an audio encoder 24, and a wireless connection manager 26. Although not shown in the example of FIG. 1, the source device 12 may include a number of other elements that support operation of apps 20, including an operating system, various hardware and/or software interfaces (such as user interfaces, including graphical user interfaces), one or more processors, memory, storage devices, and the like.

Each of the apps 20 represent software (such as a collection of instructions stored to a non-transitory computer readable media) that configure the system 10 to provide some functionality when executed by the one or more processors of the source device 12. The apps 20 may, to provide a few examples, provide messaging functionality (such as access to emails, text messaging, and/or video messaging), voice calling functionality, video conferencing functionality, calendar functionality, audio streaming functionality, direction functionality, mapping functionality, gaming functionality. Apps 20 may be first party applications designed and developed by the same company that designs and sells the operating system executed by the source device 12 (and often pre-installed on the source device 12) or third-party applications accessible via a so-called "app store" or possibly pre-installed on the source device 12. Each of the apps 20, when executed, may output audio data 21A-21N ("audio data 21"), respectively. In some examples, the audio data 21 may be generated from a microphone (not pictured) connected to the source device 12.

The mixing unit 22 represents a unit configured to mix one or more of audio data 21A-21N ("audio data 21") output by the apps 20 (and other audio data output by the operating system—such as alerts or other tones, including keyboard press tones, ringtones, etc.) to generate mixed audio data 23. Audio mixing may refer to a process whereby multiple sounds (as set forth in the audio data 21) are combined into one or more channels. During mixing, the mixing unit 22 may also manipulate and/or enhance volume levels (which may also be referred to as "gain levels"), frequency content, and/or panoramic position of the audio data 21. In the context of streaming the audio data 21 over a wireless PAN session, the mixing unit 22 may output the mixed audio data 23 to the audio encoder 24.

The audio encoder 24 may represent a unit configured to encode the mixed audio data 23 and thereby obtain encoded audio data 25. In some examples, the audio encoder 24 may encode individual ones of the audio data 21. Referring for purposes of illustration to one example of the PAN protocols, Bluetooth® provides for a number of different types of audio codecs (which is a word resulting from combining the words "encoding" and "decoding") and is extensible to include vendor specific audio codecs. The Advanced Audio Distribution Profile (A2DP) of Bluetooth® indicates that support for A2DP requires supporting a subband codec specified in A2DP. A2DP also supports codecs set forth in MPEG-1 Part 3 (MP2), MPEG-2 Part 3 (MP3), MPEG-2 Part 7 (advanced audio coding—AAC), MPEG-4 Part 3 (high efficiency-AAC—HE-AAC), and Adaptive Transform Acoustic Coding (ATRAC). Furthermore, as noted above, A2DP of Bluetooth® supports vendor specific codecs, such as aptX™ and various other versions of aptX (e.g., enhanced aptX—E-aptX, aptX live, and aptX high definition—aptX-HD).

The audio encoder 24 may operate consistent with one or more of any of the above listed audio codecs, as well as, audio codecs not listed above, but that operate to encode the mixed audio data 23 to obtain the encoded audio data 25. The audio encoder 24 may output the encoded audio data 25 to one of the wireless communication units 30 (e.g., the wireless communication unit 30A) managed by the wireless connection manager 26. In accordance with example techniques of this disclosure that will be described in more detail below, the audio encoder 24 may be configured to encode the audio data 21 and/or the mixed audio data 23 using an extended-range coarse-fine quantization technique.

The wireless connection manager 26 may represent a unit configured to allocate bandwidth within certain frequencies of the available spectrum to the different ones of the wireless communication units 30. For example, the Bluetooth® communication protocols operate over within the 2.5 GHz range of the spectrum, which overlaps with the range of the spectrum used by various WLAN communication protocols. The wireless connection manager 26 may allocate some portion of the bandwidth during a given time to the Bluetooth® protocol and different portions of the bandwidth during a different time to the overlapping WLAN protocols. The allocation of bandwidth and other is defined by a scheme 27. The wireless connection manager 40 may expose various application programmer interfaces (APIs) by which to adjust the allocation of bandwidth and other aspects of the communication protocols so as to achieve a specified quality of service (QoS). That is, the wireless connection manager 40 may provide the API to adjust the scheme 27 by which to control operation of the wireless communication units 30 to achieve the specified QoS.

In other words, the wireless connection manager 26 may manage coexistence of multiple wireless communication units 30 that operate within the same spectrum, such as certain WLAN communication protocols and some PAN protocols as discussed above. The wireless connection manager 26 may include a coexistence scheme 27 (shown in FIG. 1 as "scheme 27") that indicates when (e.g., an interval) and how many packets each of the wireless communication units 30 may send, the size of the packets sent, and the like.

The wireless communication units 30 may each represent a wireless communication unit 30 that operates in accordance with one or more communication protocols to communicate encoded audio data 25 via a transmission channel to the sink device 14. In the example of FIG. 1, the wireless communication unit 30A is assumed for purposes of illustration to operate in accordance with the Bluetooth® suite of communication protocols. It is further assumed that the wireless communication unit 30A operates in accordance with A2DP to establish a PAN link (over the transmission channel) to allow for delivery of the encoded audio data 25 from the source device 12 to the sink device 14.

More information concerning the Bluetooth® suite of communication protocols can be found in a document entitled "Bluetooth Core Specification v 5.0," published Dec. 6, 2016, and available at: www.bluetooth.org/en-us/specification/adopted-specifications. More information concerning A2DP can be found in a document entitled "Advanced Audio Distribution Profile Specification," version 1.3.1, published on Jul. 14, 2015.

The wireless communication unit 30A may output the encoded audio data 25 as a bitstream 31 to the sink device 14 via a transmission channel, which may be a wired or wireless channel, a data storage device, or the like. While shown in FIG. 1 as being directly transmitted to the sink device 14, the source device 12 may output the bitstream 31 to an intermediate device positioned between the source device 12 and the sink device 14. The intermediate device may store the bitstream 31 for later delivery to the sink device 14, which may request the bitstream 31. The intermediate device may comprise a file server, a web server, a desktop computer, a laptop computer, a tablet computer, a mobile phone, a smart phone, or any other device capable of storing the bitstream 31 for later retrieval by an audio decoder. This intermediate device may reside in a content delivery network capable of streaming the bitstream 31 (and possibly in conjunction with transmitting a corresponding video data bitstream) to subscribers, such as the sink device 14, requesting the bitstream 31.

Alternatively, the source device 12 may store the bitstream 31 to a storage medium, such as a compact disc, a digital video disc, a high definition video disc or other storage media, most of which are capable of being read by a computer and therefore may be referred to as computer-readable storage media or non-transitory computer-readable storage media. In this context, the transmission channel may refer to those channels by which content stored to these mediums are transmitted (and may include retail stores and other store-based delivery mechanism). In any event, the techniques of this disclosure should not therefore be limited in this respect to the example of FIG. 1.

As further shown in the example of FIG. 1, the sink device 14 includes a wireless connection manager 40 that manages one or more of wireless communication units 42A-42N ("wireless communication units 42") according to a scheme 41, an audio decoder 44, and one or more speakers 48A-48N ("speakers 48"). The wireless connection manager 40 may operate in a manner similar to that described above with respect to the wireless connection manager 26, exposing an API to adjust scheme 41 by which operation of the wireless communication units 42 to achieve a specified QoS.

The wireless communication units 42 may be similar in operation to the wireless communication units 30, except that the wireless communication units 42 operate reciprocally to the wireless communication units 30 to decapsulate the encoded audio data 25. One of the wireless communication units 42 (e.g., the wireless communication unit 42A) is assumed to operate in accordance with the Bluetooth® suite of communication protocols and reciprocal to the wireless communication protocol 28A. The wireless communication unit 42A may output the encoded audio data 25 to the audio decoder 44.

The audio decoder 44 may operate in a manner that is reciprocal to the audio encoder 24. The audio decoder 44 may operate consistent with one or more of any of the above listed audio codecs, as well as, audio codecs not listed above, but that operate to decode the encoded audio data 25 to obtain mixed audio data 23'. The prime designation with respect to "mixed audio data 23" denotes that there may be some loss due to quantization or other lossy operations that occur during encoding by the audio encoder 24. The audio decoder 44 may output the mixed audio data 23' to one or more of the speakers 48.

Each of the speakers 48 represent a transducer configured to reproduce a soundfield from the mixed audio data 23'. The transducer may be integrated within the sink device 14 as shown in the example of FIG. 1 or may be communicatively coupled to the sink device 14 (via a wire or wirelessly). The speakers 48 may represent any form of speaker, such as a loudspeaker, a headphone speaker, or a speaker in an earbud. Furthermore, although described with respect to a transducer, the speakers 48 may represent other forms of speakers, such as the "speakers" used in bone conducting headphones that send vibrations to the upper jaw, which induces sound in the human aural system.

As noted above, the apps 20 may output audio data 21 to the mixing unit 22. Prior to outputting the audio data 21, the apps 20 may interface with the operating system to initialize an audio processing path for output via integrated speakers (not shown in the example of FIG. 1) or a physical connection (such as a mini-stereo audio jack, which is also known as 3.5 millimeter—mm —minijack). As such, the audio processing path may be referred to as a wired audio processing path considering that the integrated speaker is connected by a wired connection similar to that provided by the physical connection via the mini-stereo audio jack. The wired audio processing path may represent hardware or a combination of hardware and software that processes the audio data 21 to achieve a target quality of service (QoS).

To illustrate, one of the apps 20 (which is assumed to be the app 20A for purposes of illustration) may issue, when initializing or reinitializing the wired audio processing path, one or more request 29A for a particular QoS for the audio data 21A output by the app 20A. The request 29A may specify, as a couple of examples, a high latency (that results in high quality) wired audio processing path, a low latency (that may result in lower quality) wired audio processing path, or some intermediate latency wired audio processing path. The high latency wired audio processing path may also be referred to as a high quality wired audio processing path, while the low latency wired audio processing path may also be referred to as a low quality wired audio processing path.

Figure 2:
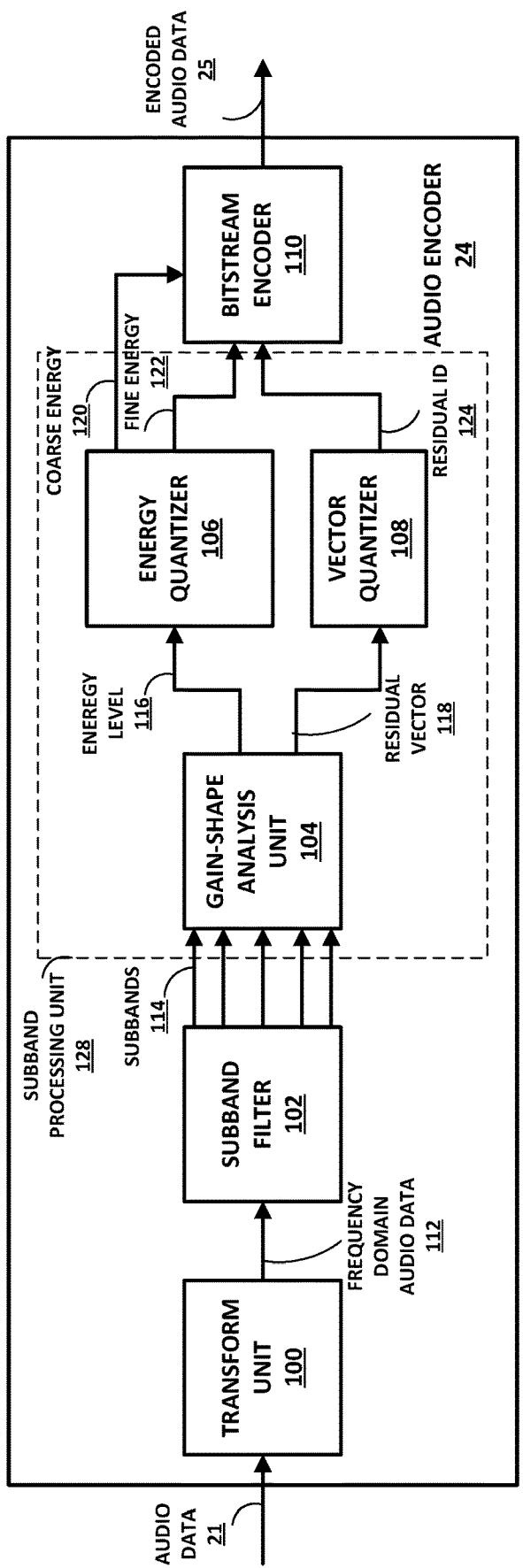
FIG. 2 is a block diagram illustrating an example audio encoder configured to perform various aspects of the techniques described in this disclosure.

FIG. 2 is a block diagram illustrating an example of an audio encoder 24 configured to perform various aspects of the techniques described in this disclosure. The audio encoder 24 may be configured to encode audio data for transmission over a PAN (e.g., Bluetooth®). However, the techniques of this disclosure performed by the audio encoder 24 may be used in any context where the compression of audio data is desired. In some examples, the audio encoder 24 may be configured to encode the audio data 21 in accordance with as aptX™ audio codec, including, e.g., enhanced aptX—E-aptX, aptX live, and aptX high definition. However, the techniques of this disclosure may be used in any audio codec configured to perform coarse-fine quantization of an energy value of frequency domain audio data. As will be explained in more detail below, the audio encoder 24 may be configured to perform various aspects of an extended-range coarse-fine quantization process in accordance with techniques of this disclosure.

In the example of FIG. 2, the audio encoder 24 may be configured to encode the audio data 21 (or the mixed audio data 23) using a gain-shape vector quantization encoding process that includes an extended-range coarse-fine quantization process. In a gain-shape vector quantization encoding process, the audio encoder 24 is configured to encode both a gain (e.g., an energy level) and a shape (e.g., a residual vector defined by transform coefficients) of a subband of frequency domain audio data. Each subband of frequency domain audio data represents a certain frequency range of a particular frame of the audio data 21.

The audio data 21 may be sampled at a particular sampling frequency. Example sampling frequencies may include 48 kHz or 44.1 kHZ, though any desired sampling frequency may be used. Each digital sample of the audio data 21 may be defined by a particular input bit depth, e.g., 16 bits or 24 bits. In one example, the audio encoder 24 may be configured operate on a single channel of the audio data 21 (e.g., mono audio). In another example, the audio encoder 24 may be configured to independently encode two or more channels of the audio data 21. For example, the audio data 21 may include left and right channels for stereo audio. In this example, the audio encoder 24 may be configured to encode the left and right audio channels independently in a dual mono mode. In other examples, the audio encoder 24 may be configured to encode two or more channels of the audio data 21 together (e.g., in a joint stereo mode). For example, the audio encoder 24 may perform certain compression operations by predicting one channel of the audio data 21 with another channel of the audio data 21.

Regardless of how the channels of the audio data 21 are arranged, the audio encoder 24 recited the audio data 21 and sends that audio data 21 to a transform unit 100. The transform unit 100 is configured to transform a frame of the audio data 21 from the time domain to the frequency domain to produce frequency domain audio data 112. A frame of the audio data 21 may be represented by a predetermined number of samples of the audio data. In one example, a frame of the audio data 21 may be 1024 samples wide. Different frame widths may be chosen based on the frequency transform being used and the amount of compression desired. The frequency domain audio data 112 may be represented as transform coefficients, where the value of each the transform coefficients represents an energy of the frequency domain audio data 112 at a particular frequency.

In one example, the transform unit 100 may be configured to transform the audio data 21 into the frequency domain audio data 112 using a modified discrete cosine transform (MDCT). An MDCT is a "lapped" transform that is based on a type-IV discrete cosine transform. The MDCT is considered "lapped" as it works on data from multiple frames. That is, in order to perform the transform using an MDCT, transform unit 100 may include a fifty percent overlap window into a subsequent frame of audio data. The overlapped nature of an MDCT may be useful for data compression techniques, such as audio encoding, as it may reduce artifacts from coding at frame boundaries. The transform unit 100 need not be constrained to using an MDCT but may use other frequency domain transformation techniques for transforming the audio data 21 into the frequency domain audio data 112.

A subband filter 102 separates the frequency domain audio data 112 into subbands 114. Each of the subbands 114 includes transform coefficients of the frequency domain audio data 112 in a particular frequency range. In some examples, subband filter 102 may be configured to separate the frequency domain audio data 112 into subbands 114 of uniform frequency ranges. In other examples, subband filter 102 may be configured to separate the frequency domain audio data 112 into subbands 114 of non-uniform frequency ranges.

For example, subband filter 102 may be configured to separate the frequency domain audio data 112 into subbands 114 according to the Bark scale. In general, the subbands of a Bark scale have frequency ranges that are perceptually equal distances. That is, the subbands of the Bark scale are not equal in terms of frequency range, but rather, are equal in terms of human aural perception. In general, subbands at the lower frequencies will have fewer transform coefficients, as lower frequencies are easier to perceive by the human aural system. As such, the frequency domain audio data 112 in lower frequency subbands of the subbands 114 is less compressed by the audio encoder 24, as compared to higher frequency subbands. Likewise, higher frequency subbands of the subbands 114 may include more transform coefficients, as higher frequencies are harder to perceive by the human aural system. As such, the frequency domain audio 112 in data in higher frequency subbands of the subbands 114 may be more compressed by the audio encoder 24, as compared to lower frequency subbands.

The audio encoder 24 may be configured to process each of subbands 114 using a subband processing unit 128. That is, the subband processing unit 128 may be configured to process each of subbands separately. The subband processing unit 128 may be configured to perform a gain-shape vector quantization process with extended-range coarse-fine quantization in accordance with techniques of this disclosure.

A gain-shape analysis unit 104 may receive the subbands 114 as an input. For each of subbands 114, the gain-shape analysis unit 104 may determine an energy level 116 of each of the subbands 114. That is, each of subbands 114 has an associated energy level 116. The energy level 116 is a scalar value in units of decibels (dBs) that represents the total amount of energy (also called gain) in the transform coefficients of a particular one of subbands 114. The gain-shape analysis unit 104 may separate energy level 116 for one of subbands 114 from the transform coefficients of the subbands to produce residual vector 118. The residual vector 118 represents the so-called "shape" of the subband. The shape of the subband may also be referred to as the spectrum of the subband.

A vector quantizer 108 may be configured to quantize the residual vector 118. In one example, the vector quantizer 108 may quantize the residual vector using a pyramid vector quantization (PVQ) process to produce the residual ID 124. Instead of quantizing each sample separately (e.g., scalar quantization), the vector quantizer 108 may be configured to quantize a block of samples included in the residual vector 118 (e.g., a shape vector). In some examples, the vector quantizer 108 may use a Linde-Buzo-Gray (LBG) algorithm to perform the vector quantization. A Linde-Buzo-Gray (LBG) algorithm typically results in less distortion with a fixed available bit-rate compared to scalar quantization. However, any vector quantization techniques method can be used along with the extended-range coarse-fine energy quantization techniques of this disclosure.

For example, the vector quantizer 108 may use structured vector quantization algorithms reduce storage and computational complexity LGB algorithms. A structured vector quantization may involve performing the quantization based upon a set of structured code-vectors that do not need to be stored explicitly and can be identified functionally. Examples of the structured vector quantizers include Lattice vector quantizers and Pyramid Vector Quantizers (PVQ). Using PVQ, the vector quantizer 108 may be configured to map the residual vector 118 to a hyperpyramid (with constant L1 norm) or a hypersphere (with constant L2 norm) and quantize the residual vector 118 upon the underlying structured codebook. The quantization code-vectors are then enumerated and assigned an ID (e.g., the residual ID 124) to be encoded and transmitted. The quality of the mapping drives the accuracy of the quantization, while the number of enumeration code-vectors specifies the shape transmission rate.

In some examples, the audio encoder 24 may dynamically allocate bits for coding the energy level 116 and the residual vector 118. That is, for each of subbands 114, the audio encoder 24 may determine the number of bits allocated for energy quantization (e.g., by the energy quantizer 106) and the number of bits allocated for vector quantization (e.g., by the vector quantizer 108). As will be explained in more detail below, the total number of bits allocated for energy quantization may be referred to as energy-assigned bits. These energy-assigned bits may then be allocated between a coarse quantization process and a fine quantization process.

An energy quantizer 106 may receive the energy level 116 of the subbands 114 and quantize the energy level 116 of the subbands 114 into a coarse energy 120 and a fine energy 122. This disclosure will describe the quantization process for one subband, but it should be understood that the energy quantizer 106 may perform energy quantization on one or more of the subbands 114, including each of the subbands 114. In general, the energy quantizer 106 may perform a two-step quantization process. Energy quantizer 106 may first quantize the energy level 116 with a first number of bits for a coarse quantization process to generate the coarse energy 120. The energy quantizer 106 may generate the coarse energy using a predetermined range of energy levels for the quantization (e.g., the range defined by a maximum and a minimum energy level. The coarse energy 120 approximates the value of the energy level 116. The energy quantizer 106 may then determine a difference between the coarse energy 120 and the energy level 116. This difference is sometimes called a quantization error. The energy quantizer 106 may then quantize the quantization error using a second number of bits in a fine quantization process to produce the fine energy 122. The number of bits used for the fine quantization bits is determined by the total number of energy-assigned bits minus the number of bits used for the coarse quantization process. When added together, the coarse energy 120 and the fine energy 122 represent a total quantized value of the energy level 116.

The audio encoder 24 may be further configured encode the coarse energy 120, the fine energy 122, and the residual ID 124 using a bitstream encoder 110 to create the encoded audio data 25. The bitstream encoder 110 may be configured to further compress the coarse energy 120, the fine energy 122, and the residual ID 124 using one or more entropy encoding techniques. Entropy encoding techniques may include Huffman coding, arithmetic coding, context-adaptive binary arithmetic coding (CABAC), and other similar encoding techniques. The encoded audio data 25 may then be transmitted to the sink device 14 and/or stored in a memory for later use.

In one example of the disclosure, the quantization performed by the energy quantizer 106 is a uniform quantization. That is, the step sizes (also called "resolution) of each quantization are equal. In some examples, the steps sizes may be in units of decibels (dBs). The step size for the coarse quantization and the fine quantization may be determined, respectively, from a predetermined range of energy values for the quantization and the number of bits allocated for the quantization. In one example, the energy quantizer 106 performs uniform quantization for both coarse quantization (e.g., to produce the coarse energy 120) and fine quantization (e.g., to produce the fine energy 122).

Performing a two-step, uniform quantization process is equivalent to performing a single uniform quantization process. However, by splitting the uniform quantization into two parts, the bits allocated to coarse quantization and fine quantization may be independently controlled. This may allow for more flexibility in the allocation of bits across energy and vector quantization and may improve compression efficiency. Consider an M-level uniform quantizer, where M defines the number of levels (e.g., in dB) into which the energy level may be divided. M may be determined by the number of bits allocated for the quantization. For example, the energy quantizer 106 may use M1 levels for coarse quantization and M2 levels for fine quantization. This equivalent to a single uniform quantizer using M1*M2 levels.

Figure 3:
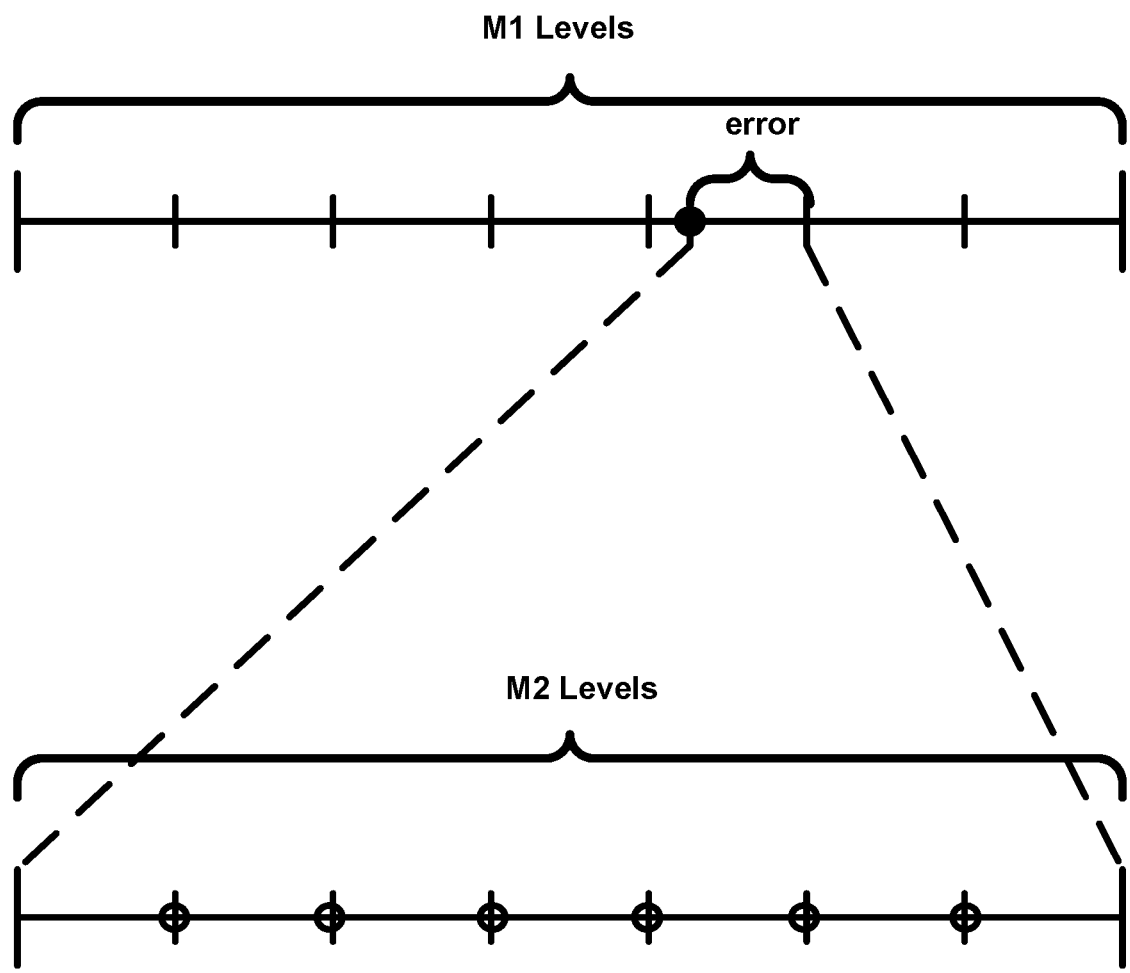
FIG. 3 is a conceptual diagram showing an example of a two-step uniform quantization process.
Figure 4:
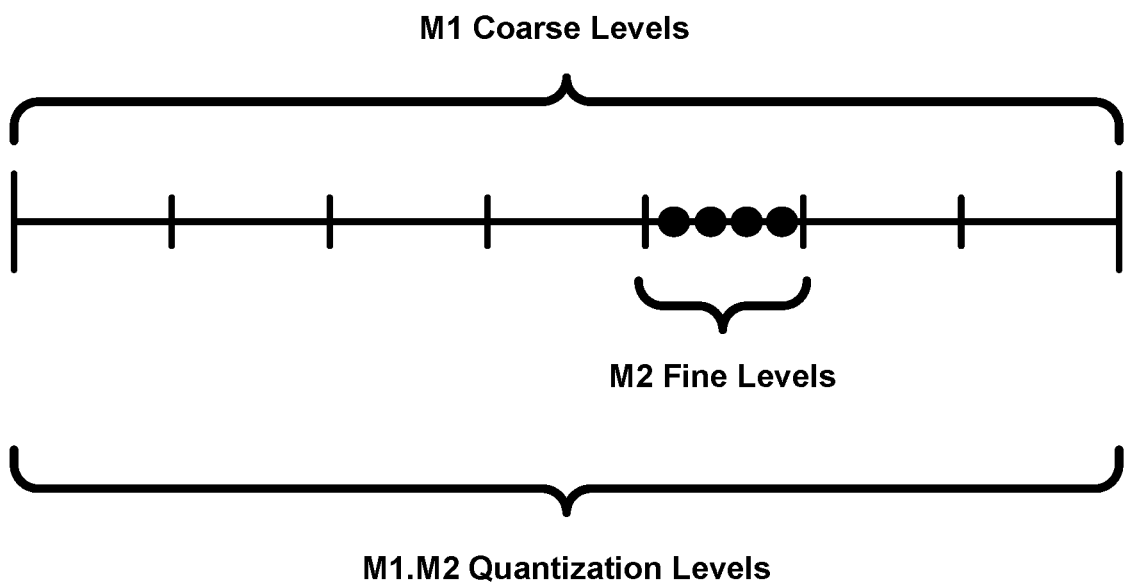
FIG. 4 is a conceptual diagram showing how a two-step uniform coarse-fine quantization is equivalent to a single uniform quantization.

FIG. 3 is a conceptual diagram showing an example of a two-step uniform quantization process. As shown in FIG. 3, a coarse quantization process may use M1 levels (e.g., as determined by a number of bits allocated to the coarse quantization process) to quantize an input energy level. The difference between the output of the coarse quantization process and the input energy level is the error. The error may then be quantized by in a fine quantization process using M2 levels (e.g., as determined by a number of bits allocated to the fine quantization process). FIG. 4 is a conceptual diagram showing how a two-step uniform coarse-fine quantization is equivalent to a single uniform quantization.

In one example, the minimum and maximum energy levels that determine the predetermined range for coarse quantization may be determined by analysis a statistical distribution of energy scalars over a give set of data. The minimum and maximum energy levels may be determined such that a desired level of compression is achieved without sacrificing an undesirable amount of audio fidelity. However, in some example audio signals, the energy level of a particular subband may be outside the predetermined range of energy values for coarse quantization. That is, the energy level of a particular subband may be above or below the predetermined maximum and minimum energy levels for coarse quantization. This problem may occur more often at higher frequency subbands, where the number of bits assigned for coarse quantization leads to narrow levels for coarse energy quantization. When the energy levels of a subband are outside of a predetermined range for coarse quantization, encoding errors may increase. Such encoding errors may lead to increased harmonic distortion, more perceptible quantization noise, high-frequency content attenuation, poor transient tracking, and potentially lower audio perceptual quality.

Figure 5:
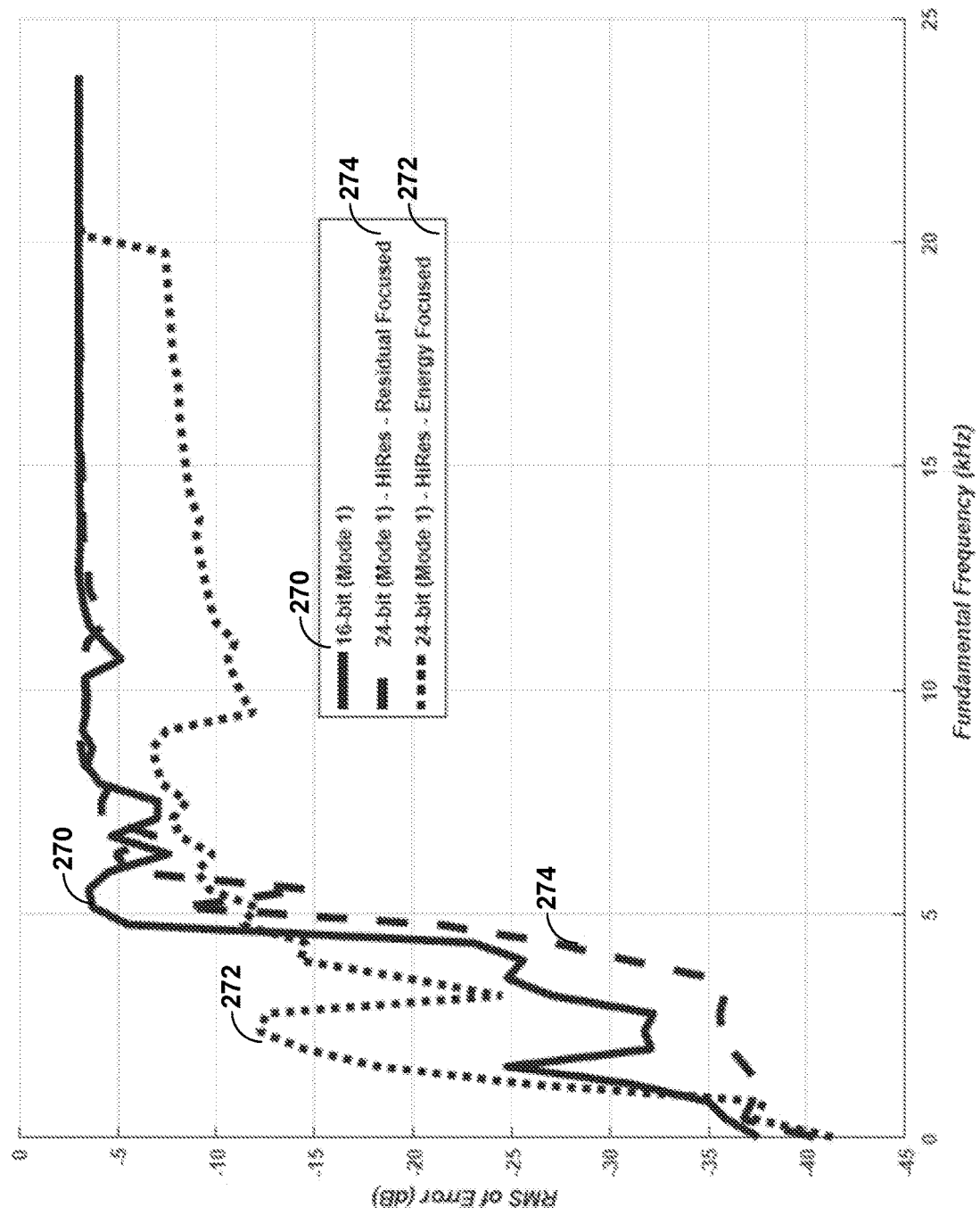
FIG. 5 is a graph illustrating audio signal error for different audio coding techniques.

FIG. 5 is a graph illustrating audio signal error for different audio coding techniques. FIG. 5 shows the root means square (RMS) of the error in audio data across a spectrum of fundamental frequencies. The different plots in FIG. 5 represent audio data encoded using different coding modes. As shown in FIG. 5, the plot 270 represents audio encoded using a 16-bit quantization that does not use the extended-range coarse quantization techniques of this disclosure. In general, audio data encoded using 16-bit quantization exhibits a relatively high RMS of error. The plot 274 represents audio data encoded using a 24-bit quantization on the residual vector, with fewer bits assigned to energy quantization. The RMS of error on audio data encoding using a 24-bit quantization on the residual vector remains relatively poor. The plot 272 represents audio data encoded using a 24-bit quantization on the energy level, with fewer bits assigned to residual vector quantization. The RMS of error on audio data encoding using a 24-bit quantization on the energy level is generally improved. However, low-frequency performance shown for plot 272 is relatively poor due to fewer bits assigned for residual ID quantization. Accordingly, merely assigning more bits to energy quantization may not address problems with subbands having energy levels that are outside the predetermined range for coarse quantization.

This disclosure describes techniques for an extended-range coarse quantization process that may improve the encoding quality of subbands for frequency domain audio data having abnormally higher or low energy values. The audio encoder 24 may determine the number of bits to use for both coarse and fine quantization using a predetermined energy range for coarse quantization. The energy quantizer 106 of the audio encoder 24 may determine if the energy level for a subband is outside the predefined range for coarse quantization. If so, the energy quantizer 106 may reallocate the bits assigned for fine quantization to an extended-range coarse quantization process. This ensures that the resolution of the coarse energy remains accurate. The energy quantizer 106 may perform extended range coarse quantization using an extended (i.e., larger) range of energy values compared to the initial coarse quantization process.

Figure 6:
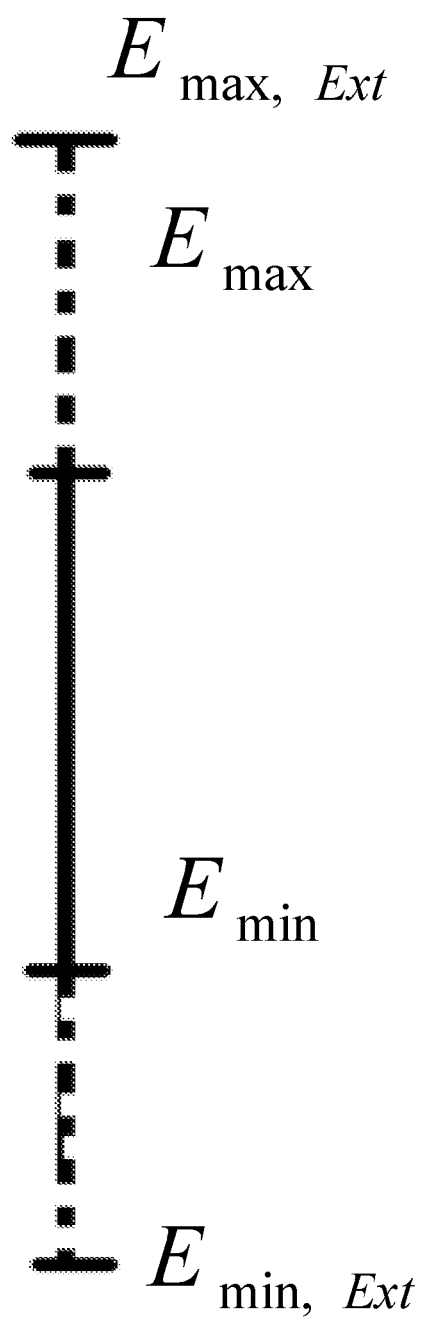
FIG. 6 is a conceptual diagram illustrating an extension of a range of energy values for performing an extended-range coarse quantization process.

FIG. 6 is a conceptual diagram illustrating an extension of a range of energy values for performing an extended-range coarse quantization process. As shown in FIG. 6, the energy quantizer 106 may perform a coarse quantization process using a predetermined range of energy values $E_{max}$ and $E_{min}$. If the energy quantizer 106 determines that the energy level of a subband is outside this range, the energy quantizer may reassign bits assigned for fine quantization process to use in an extended-range coarse quantization process. The extended-range coarse quantization process may use an extended-range of energy levels defined by $E_{max, Ext}$ and $E_{min, Ext}$. As can be seen in FIG. 6, the extended range of energy levels is larger than the predetermined range of energy levels for the initial coarse quantization process.

After performing the extended-range coarse quantization process, the energy quantizer 106 may then compute the difference between the original total energy of the subband and the extended range coarse energy. This difference may then be coded using an extended-range fine quantization process with any remaining bits that are available.

This process can address subbands having out-of-range energy values, such as transients, tones, and sudden frequency content variations, seamlessly. Using a two-step approach of quantization, allows the system to be able to control coarse and fine quantization energy levels independently. The extended-range quantization improves reconstruction errors, and encodes tones, sharp transients, abrupt frequency content variations robustly. It also allows high flexibility to extend in different levels of accuracy, depending on the available bit budget.

Figure 7:
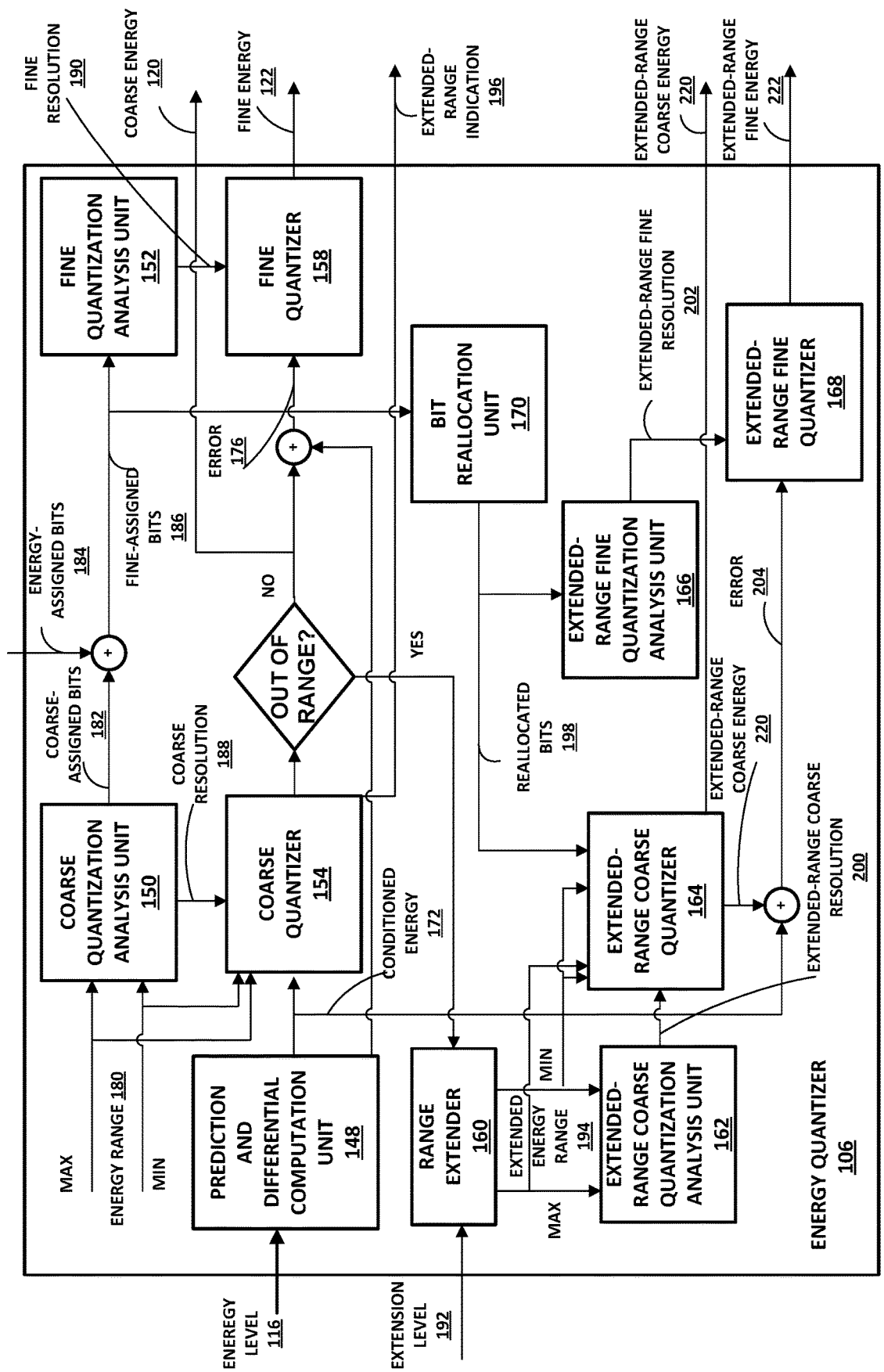
FIG. 7 is a block diagram illustrating an example energy quantizer configured to perform various aspects of the techniques described in this disclosure.

FIG. 7 is a block diagram illustrating an example energy quantizer 106 configured to perform various aspects of the techniques described in this disclosure. In particular, the energy quantizer 106 may be configured to perform one or more extended-range coarse-fine quantization techniques of this disclosure.

The energy level 116 is input to the energy quantizer 106. As discussed above, the energy level 116 is an energy level of one of subbands 114 of frequency domain audio data. A predictive and differential computation unit 148 may perform frame-wise and/or subband-wise prediction of the energy level 116 to produce conditioned energy 116. Frame-wise prediction may refer to subtracting the energy level of the same subband in another frame of audio data from the energy level 116 of the current subband. Subband-wise prediction may refer to subtracting the energy level of another subband in the same frame of audio data from the energy level 116 of the current subband. In some examples, both frame-wise and subband-wise prediction may be performed, where some function of frame and subband predictors may be used as the predictor for the current energy level 116. The prediction process performed by predictive and differential computation unit 148 may be used to create a generally smaller energy level for performing the quantization.

A coarse quantization analysis unit 150 may be configured to determine the coarse resolution 188 and the coarse-assigned bits 182 for the coarse quantizer 154. The coarse resolution 188 defines the step size (e.g., in units of decibels) used by the coarse quantizer 154. Coarse quantization analysis unit may determine the coarse resolution based on the energy range 180 and the number of coarse-assigned bits 182. In some examples, the energy range 180 is a predetermined energy range defined by a maximum (max) and minimum (min) energy value (e.g., $E_{max}$ and $E_{min}$ in FIG. 6). In some examples, the energy range 180 is the same for every subband of a frame. In other examples, the energy range 180 is dependent on the frequency range of the subband being processed.

In some examples, the coarse quantization analysis unit 150 unit may determine the same number of coarse-assigned bits 182 for every subband of frame. That is, in some examples, the number of coarse-assigned bits is fixed. In other examples, the coarse quantization analysis unit 150 may determine the number of coarse-assigned bits based on the particular subband being encoded and/or based on the energy level 116 of the current subband. The energy quantizer may determine the number of fine-assigned bits to use for fine quantizer 158 by subtracting the coarse-assigned bits 182 from the energy-assigned bits 184. The energy-assigned bits 184 are the number of bits the audio encoder 24 allocates for the entire energy quantization process of the energy quantizer 106. The fine quantization analysis unit 152 may be configured to determine the fine resolution 190 for the fine quantizer 158 based on the fine-assigned bits 186. The fine resolution 190 defines the step size (e.g., in units of decibels) used by the fine quantizer 158.

A coarse quantizer 154 may be configured to quantize the conditioned energy 172 in accordance with the coarse resolution 188 and the energy range 180 using the coarse-assigned bits 182. Through quantization, the coarse quantizer 154 creates the coarse energy 120. In one example, during the quantization process, the coarse quantizer may determine if the energy level of the conditioned energy 172 is out of range of the energy range 180. In other examples of the disclosure, the energy quantizer 106 may determine if the original input energy level 116 is outside of the range of energy range 180.

If the energy level of the quantized coarse energy 120 is not outside of the energy range 180, the two-step quantization process continues to the fine quantizer 158. First, the energy quantizer 106 subtracts the quantized coarse energy 120 from the conditioned energy 172. As discussed above, this result may be referred to as the quantization error 176. The fine quantizer 158 may then perform a fine quantization process, based on the fine resolution 190 and the fine-assigned bits 186, on the error 176 to produce the quantized fine energy 122. At this point, the energy quantization process for the subband ends.

If, instead, the energy level of the quantized coarse energy 120 is determined to be outside of the energy range 180, the energy quantizer 106 may be configured to perform an extended-range coarse quantization process on the conditioned energy 172. Coarse quantizer 154, or another unit of energy quantizer 106, may be configured to signal an extended-range indication 196 (e.g., as a syntax element) that indicates to an audio decoder (e.g., the audio decoder 44 of FIG. 1) whether or not the extended-range coarse quantization process was performed for a particular subband. The audio decoder 44 may then be configured to perform an inverse quantization process on any received encoded energy levels based on the indications. For example, depending on whether or not extended-range coarse quantization was used, the audio decoder 44 may determine different scaling factors to use in an inverse quantization process.

For example, audio decoder 44 may determine the energy range to use for coarse quantization based on the indication. If the indication indicates that extended-range coarse quantization was not used, a regular energy range (e.g., energy range 180) may be used to map the quantized coarse energy 120 to an actual conditioned energy level based on the energy range. If the indication indicates that extended-range coarse quantization was used, an extended energy range (e.g., energy range 194) may be used to map the quantized extended-range coarse energy 220 to an actual conditioned energy level based on the energy range. In this context, the scaling factor may refer to how the quantized coarse energy 120 is mapped to a conditioned energy level given the use of either a normal energy range (e.g., energy range 180) or an extended energy range (e.g., extended energy range 194). The energy range 180 and the extended energy range 194 may be predetermined and stored at both audio encoder 24 and audio decoder 44. However, it is not necessary to use the same energy range 180 and the extended energy range 194 for each of the subbands 114. That is, audio encoder 24 and audio decoder 44 may store a different energy range 180 and extended energy range 194 for each of subbands 114.

In response to a determination that the quantized coarse energy 120 is outside of the energy range 180, a bit reallocation unit 170 may be configured to reallocate some of the fine-assigned bits 186 to an extended-range coarse quantization process. The reallocated bits 198 may be used by extended-range coarse quantizer 164 to quantize the conditioned energy 172. In some examples, the bit reallocation unit 170 may be configured to reallocate a fixed number of the reallocated bits 198 to the extended-range coarse quantizer 164. In other examples, the bit reallocation unit 170 may be configured to reallocate a dynamic number of the reallocated bits 198 to the extended-range coarse quantizer 164. In one example, the number of reallocated bits 198 may be based on energy level of quantized energy 120 (e.g., based on how far out of range the energy was). In other examples, the number of reallocated bits 198 may be based on the frequency range of the particular subband being encoded. The number of reallocated bits 198 added to the coarse-assigned bits 182 results in the extended-range coarse-assigned bits.

Also in response to a determination that the quantized coarse energy 120 is outside of the energy range 180, a range extender 160 may be configured to determine an extended energy range 194 to use in an extended-range coarse quantization process. Referring back to FIG. 6, the extended energy range 194 may be defined by new maximum and minimum energy values (e.g., $E_{max,\ Ext}$ and $E_{min,\ Ext}$). The extended energy range 194 is larger than the initial energy range 180. In some examples, the range extender 160 may determine the extended energy range 194 based on an extension level 192. The extension level 192 may define an increased number of steps to use in quantization and/or an increase decibel range to use for extended energy range 194 (e.g., 3 dB, 5 dB, 7 dB, etc.). In some examples, the extension level 192 may be based on the particular frequency range of the subband.

An extended-range coarse quantization analysis unit 162 may determine an extended-range coarse resolution 200 based on the extended energy range 194 and the extended-range coarse-assigned bits. Again, the extended-range coarse-assigned bits are the coarse-assigned bits 182 plus the reallocated bits 198.

An extended-range coarse quantizer 164 may be configured to quantize the conditioned energy 172 in accordance with the extended-range coarse resolution 200 and the extended energy range 194 using the extended-range coarse-assigned bits. Through quantization, the extended-range coarse quantizer 164 creates the extended-range coarse energy 220.

An extended-range fine quantization analysis unit 166 may determine the number of extended-range fine-assigned bits by subtracting the number of reallocated bits 198 form the fine-assigned bits 186. Based on the extended-range fine-assigned bits, extended-range fine quantization analysis unit 166 may determine an extended-range fine resolution 202 for extended-range fine quantizer 168.

Energy quantizer 106 subtracts the quantized extended-range coarse energy 220 from the conditioned energy 172. This result may be referred to as the quantization error 204. The extended-range fine quantizer 168 may then perform a fine quantization process, based on the extended-range fine resolution 202 and the extended-range fine-assigned bits, on the error 204 to produce the quantized extended-range fine energy 222. At this point, the energy quantization process for the subband ends.

Figure 8:
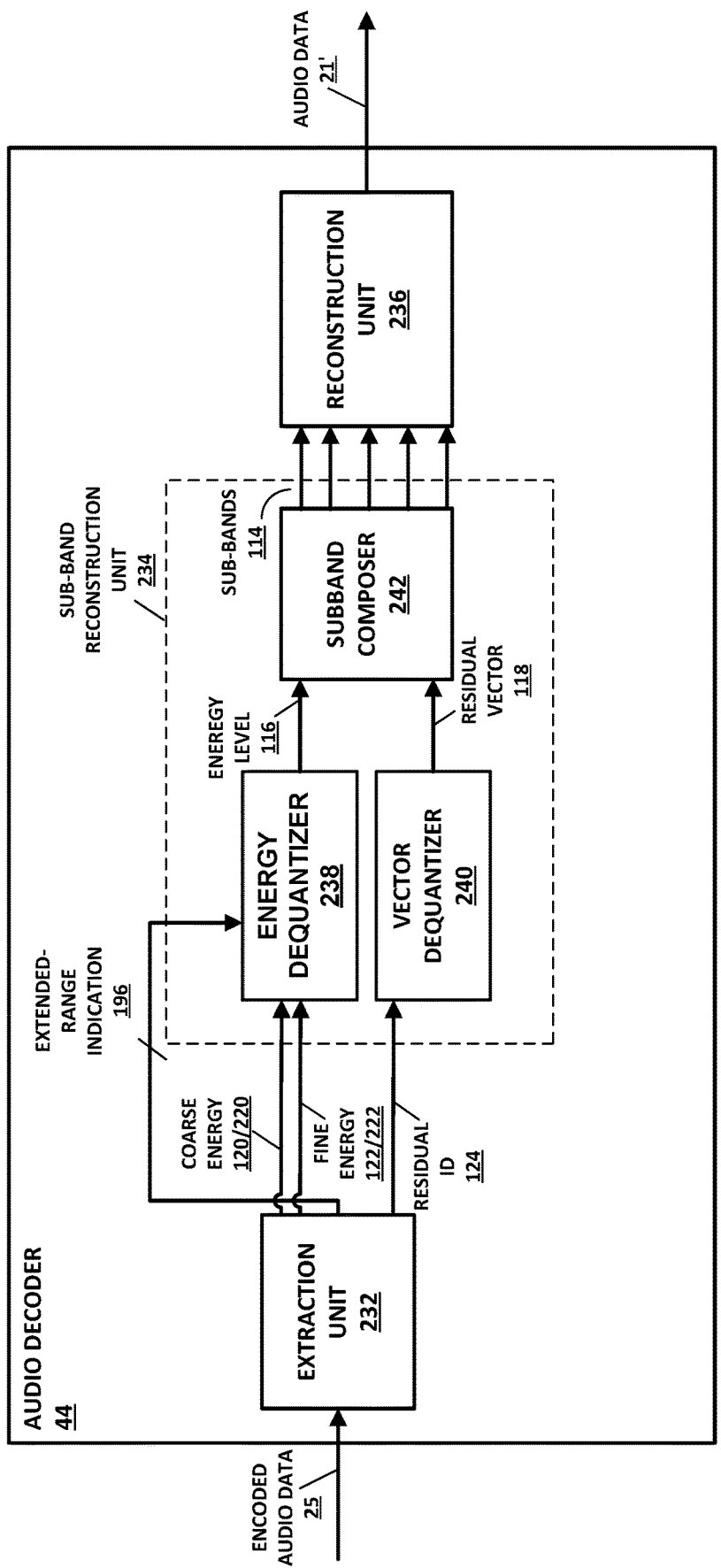
FIG. 8 is a block diagram illustrating an example audio decoder configured to perform various aspects of the techniques described in this disclosure.

FIG. 8 is a block diagram illustrating an implementation of the audio decoder 44 of FIG. 1 in more detail. In the example of FIG. 8, the audio decoder 44 includes an extraction unit 232, a subband reconstruction unit 234, and a reconstruction unit 236. The extraction unit 232 may represent a unit configured to extract the coarse energy 120, the fine energy 122, and the residual ID 124 from the encoded audio data 25. The extraction unit 232 may extract, based on an energy bit allocation, one or more of the coarse energy 120/220, the fine energy 122/222, and the residual ID 124. The coarse energy received may either be the coarse energy 120 quantized by the normal coarse energy quantization process or the extended-range coarse energy 220 quantized by the extended-range coarse energy quantization process. Likewise, the fine energy received may either be the fine energy 122 quantized by the normal fine energy quantization process or the extended-range fine energy 222 quantized by the extended-range fine energy quantization process. The extraction unit 232 may output the coarse energy 120/220, the fine energy 122/222 and the residual ID 124 to the subband reconstruction unit 234.

The subband reconstruction unit 234 may represent a unit configured to operate in a manner that is reciprocal to the operation of the subband processing unit 128 of the audio encoder 24 shown in the example of FIG. 2. The subband reconstruction unit 234 may, in other words, reconstruct the subband s from the coarse energy 120, the fine energy 122, and the residual ID 124. The subband reconstruction unit 234 may include an energy dequantizer 238, a vector dequantizer 240, and a subband composer 242.

The energy dequantizer 238 may represent a unit configured to perform dequantization in a manner reciprocal to the quantization performed by the energy quantizer 106 illustrated in FIG. 2 and FIG. 7. The energy dequantizer 238 may perform dequantization (also called inverse quantization) with respect to the coarse energy 120 and the fine energy 122 to obtain the predicted/difference energy levels, which the energy dequantizer 238 may perform inverse prediction or difference calculations to obtain the energy level 116. The energy dequantizer 238 may output the energy level 116 to the subband composer 242.

If the encoded audio data 25 includes a syntax element (e.g., the extended-range indication 196) set to a value indicating that the coarse energy 120 was quantized using an extended range, then the energy dequantizer 238 may dequantize the coarse energy 120 and the fine energy 122 in accordance with an extended-range dequantization process. If the encoded audio data 25 includes a syntax element (e.g., the extended-range indication 196 of FIG. 7) set to a value indicating that the coarse energy 120 was not quantized using an extended range, then the energy dequantizer 238 may dequantize the coarse energy 120 and the fine energy 122 in accordance with a normal range dequantization process. The extended-range indication 196 may be received for each of the subbands 114.

The vector dequantizer 240 may represent a unit configured to perform vector dequantization in a manner reciprocal to the vector quantization performed by the vector quantizer 108. The vector dequantizer 240 may perform vector dequantization with respect to the residual ID 124 to obtain the residual vector 118. The vector dequantizer 240 may output the residual vector 118 to the subband composer 242.

The subband composer 242 represents a unit configured to operate in a manner reciprocal to the gain-shape analysis unit 104. As such, the subband composer 242 may perform inverse gain-shape analysis with respect to the energy level 116 and the residual vector 118 to obtain the subband s 114. The subband composer 242 may output the subband s 114 to the reconstruction unit 236.

The reconstruction unit 236 may represent a unit configured to reconstruct, based on the subband s 114, the audio data 21'. The reconstruction unit 236 may, in other words, perform inverse subband filtering in a manner reciprocal to the subband filtering applied by the subband filter 102 to obtain the frequency domain audio data 112. The reconstruction unit 236 may next perform an inverse transform in a manner reciprocal to the transform applied by the transform unit 100 to obtain the audio data 21'.

Figure 9:
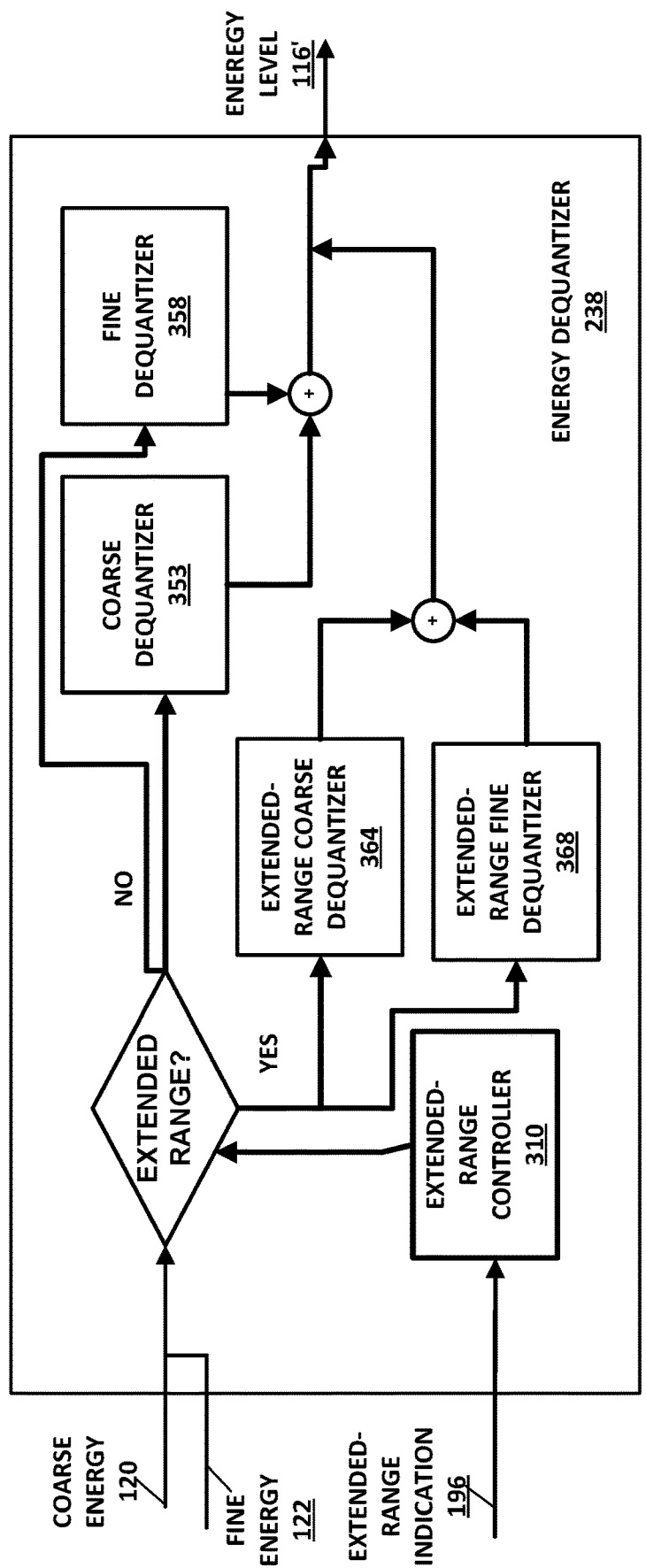
FIG. 9 is a block diagram illustrating an example energy dequantizer configured to perform various aspects of the techniques described in this disclosure.

FIG. 9 is a block diagram showing an example of the energy dequantizer 238 of FIG. 8 in more detail. The energy dequantizer 238 may be configured to perform one or more extended-range coarse-fine quantization techniques of this disclosure. The energy dequantizer 238 may be configured to receive the quantized coarse energy 120/220 and the quantized fine energy 122/22 that were quantized by the audio encoder 24. In accordance with the techniques of this disclosure, the audio encoder 24 is configured to quantize the coarse energy 120/220 and the fine energy 122/22 using a predetermined coarse energy range for quantization or an extended range for coarse energy quantization. As an example, coarse energy quantization may be performed using a predetermined energy range defined by a maximum (max) and minimum (min) energy value (e.g., $E_{max}$ and $E_{min}$ in FIG. 6). Extended-range coarse energy quantization may be defined by new maximum and minimum energy values (e.g., $E_{max,\ Ext}$ and $E_{min,\ Ext}$) that is a larger range than the coarse energy quantization.

In order to determine what range of quantization was used, the energy dequantizer 238 may be configured to receive an extended-range indication 196 at an extended-range controller 310. The extended-range indication 196 may be a 1-bit syntax element that indicates whether or not an extended-range coarse energy quantization process was used at the audio encoder 24. For example, a value of "1" for the extended-range indication 196 indicates that the extended-range coarse energy quantization process was used by the audio encoder 24 and a value of "0" for the extended-range indication 196 indicates that the extended-range coarse energy quantization process was not used by the audio encoder 24, or vice versa.

Depending on the value the extended-range indication 196, extended-range controller 310 may route the received coarse energy 120/220 and the fine energy 122/22 to the appropriate dequantization units. If extended-range coarse quantization was not used, the extended-range controller 310 routes coarse energy 120 and fine energy 122 to the coarse dequantizer 353 and the fine dequantizer 358, respectively. The coarse dequantizer 353 and the fine dequantizer 358 convert the quantized values of coarse energy 120 and fine energy 122 into energy values based on a predetermined range for coarse quantization (e.g., $E_{max}$ and $E_{min}$ in FIG. 6). The dequantized energy values are added together to produce energy level 116'.

If extended-range coarse quantization was used, the extended-range controller 310 routes coarse energy 220 and fine energy 222 to the extended-range coarse dequantizer 364 and the extended-range fine dequantizer 368, respectively. The extended-range coarse dequantizer 364 and the extended-range fine dequantizer 368 convert the quantized values of coarse energy 220 and fine energy 222 into energy values based on an extended-range for coarse quantization (e.g., $E_{max,\ Ext}$ and $E_{min,\ Ext}$ in FIG. 6). This process may be repeated for each of subbands 114.

Figure 10:
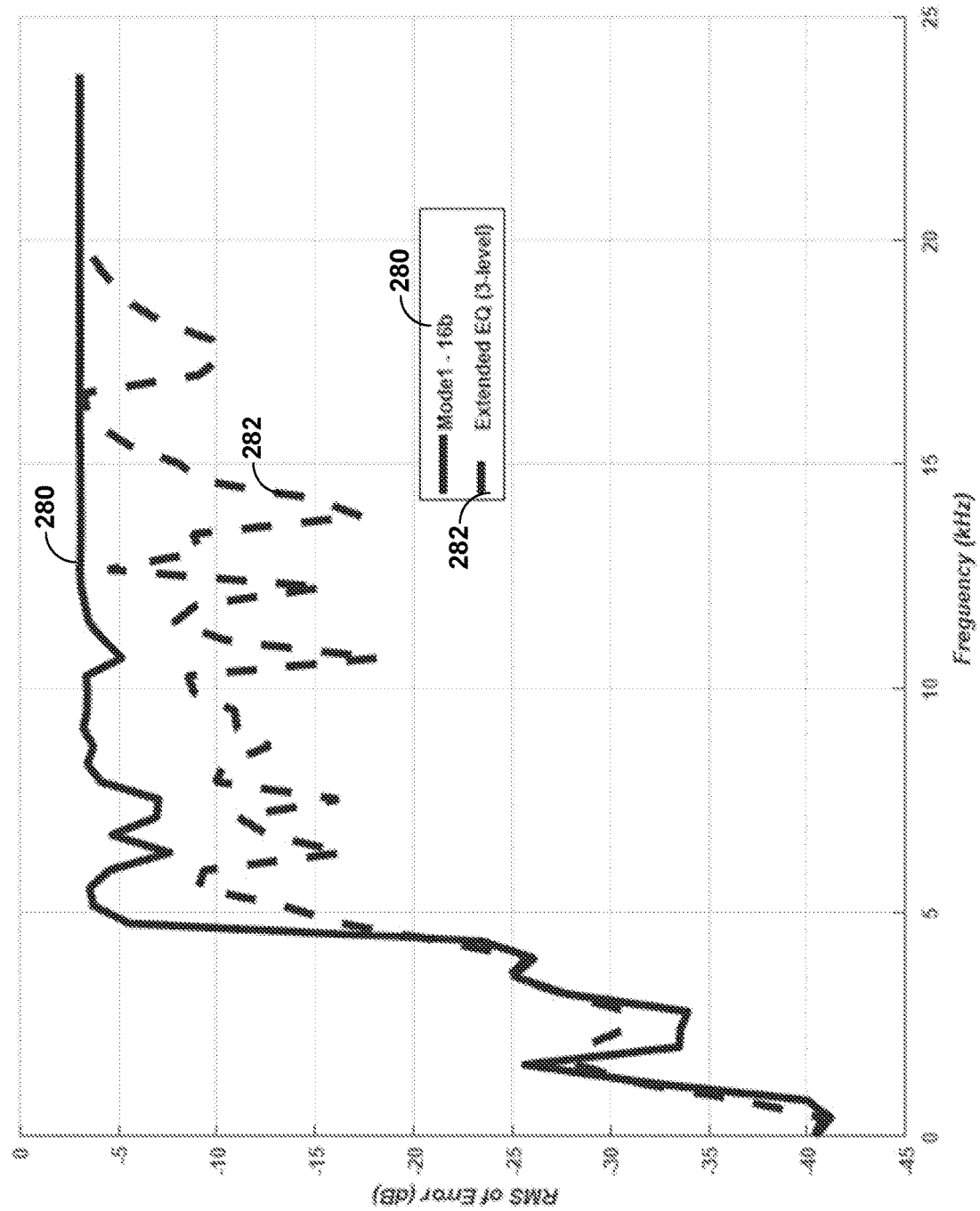
FIG. 10 is a graph illustrating audio signal error for different audio coding techniques.

FIG. 10 is a graph illustrating audio signal error for different audio coding techniques. As shown in FIG. 10, Model (280) represents audio encoded using a 16-bit quantization that does not use the extended-range coarse quantization techniques of this disclosure. The other plot (282) on FIG. 10 show the RMS of the error for audio data coded using a 3-level extension for the extended-range coarse quantization process (e.g., for energy quantization (EQ)) of this disclosure. In general, the RMS of error for audio data encoded using the 3-level extended-range coarse quantization techniques of this disclosure is improved (i.e., has a lower error across more frequency ranges) relative to not using an extended-range coarse quantization process.

Figure 11:
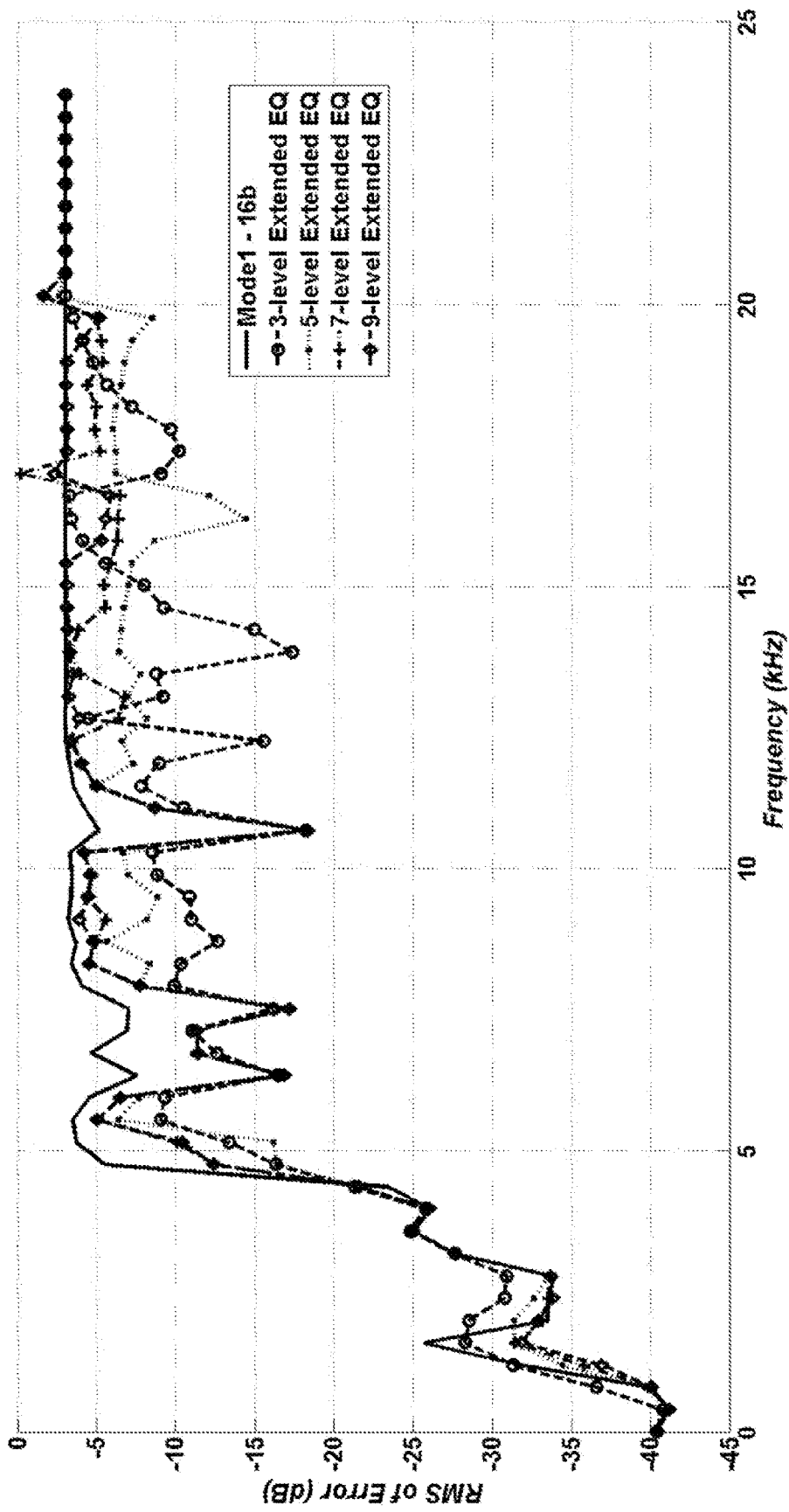
FIG. 11 is a graph illustrating audio signal error for different audio coding techniques with different extension levels.

FIG. 11 is a graph illustrating audio signal error for different audio coding techniques with different extension levels. As shown in FIG. 11, Model is a 16-bit quantization that does not use the extended-range coarse quantization techniques of this disclosure. The RMS of the error for Mode 1 is generally higher than the other modes shown in FIG. 1. The other plots on FIG. 11 show the RMS of the error for audio data coded using different extension levels for the extended-range coarse quantization process of this disclosure. In general, the RMS of error for audio data encoded using the techniques of this disclosure is improved (i.e., has a lower error across more frequency ranges) relative to not using an extended-range coarse quantization process.

Figure 12:
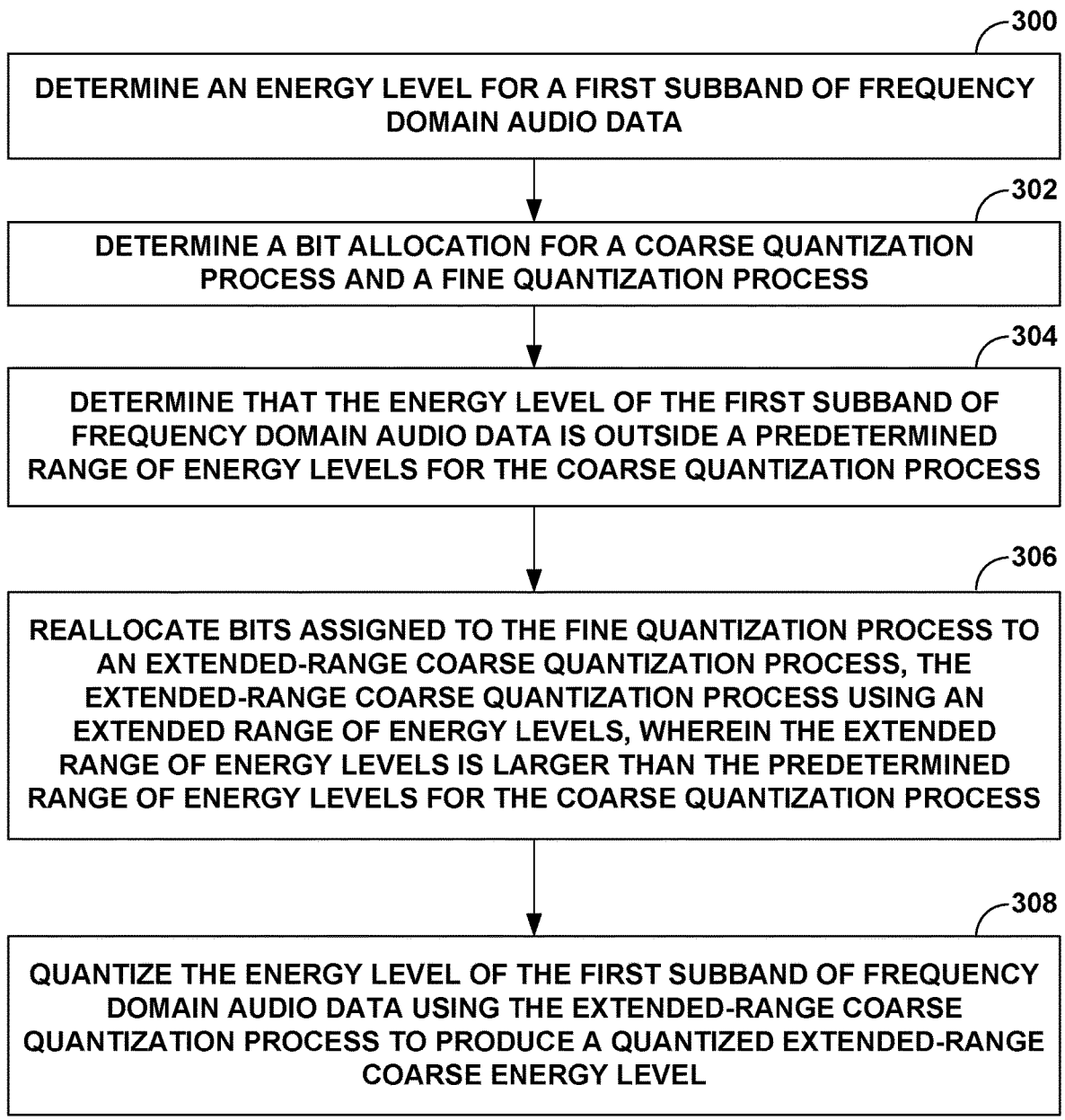
FIG. 12 is a flowchart illustrating example operation of the source device of FIG. 1 in performing various aspects of the techniques described in this disclosure.

FIG. 12 is a flowchart illustrating example operation of the source device 12 of FIG. 1 in performing various aspects of the techniques described in this disclosure. As shown in the example of FIG. 12, the audio encoder 24 of the source device 12 may be configured to encode audio data in accordance with the techniques of this disclosure. The techniques of FIG. 12 are described with reference to a single subband of a frame audio data. However, it should be understood that the techniques of FIG. 12 may be applied to any number of subbands of a frame of audio data, including all subbands of a frame of audio data.

The audio encoder 24 may be configured to determine an energy level of a first subband of frequency domain audio data (300). In one example of the disclosure, the audio encoder 24 may first be configured to perform a frequency domain transformation on the audio data to create frequency domain audio data and filter the frequency domain audio data into a plurality of subbands of frequency domain audio data, the plurality of subbands of frequency domain audio data including the first subband of frequency domain audio data.

The audio encoder 24 may be further configured to determine a bit allocation for a coarse quantization process and a fine quantization process (302). In one example, in order to determine the bit allocation for the coarse quantization process and the fine quantization process, the audio encoder 24 may be further configured to determine a total number of bits to use to quantize the energy level of the first subband of frequency domain audio, determine a first number of bits to use to perform the coarse quantization process, and determine a second number of bits to use to perform the fine quantization process based on the determined total number of bits and the determined first number of bits.

The audio encoder 24 may determine that the energy level of the first subband of frequency domain audio data is outside a predetermined range of energy levels for the coarse quantization process (304). In one example, the audio encoder may first quantize the energy level of the first subband of frequency domain audio data using the coarse quantization process to create a quantized coarse energy level. Then, in order to determine that the energy level of the first subband of frequency domain audio data is outside the predetermined range of energy levels, the audio encoder 24 may be further configured to determine that the quantized coarse energy level is outside the predetermined range of energy levels.

The audio encoder 24 may reallocate bits assigned to the fine quantization process to an extended-range coarse quantization process, wherein the extended-range coarse quantization process using an extended-range of energy levels, and wherein the extended-range of energy levels is larger than the predetermined range of energy levels for the coarse quantization process (306). In another example, the audio encoder 24 may be configured to determine the extended-range of energy levels for the extended-range coarse quantization process based on a frequency range of the first subband of frequency domain audio data.

In one example, in order to reallocate bits assigned to the fine quantization process to the extended-range coarse quantization process, the audio encoder 24 may be further configured to reallocate one or more of the determined second number of bits to the extended-range coarse quantization process, wherein the extended-range coarse quantization process uses a third number of bits. In another example, the audio encoder 24 may be configured to determine the extended-range of energy levels for the extended-range coarse quantization process based on a frequency range of the first subband of frequency domain audio data.

In another example, the audio encoder 24 may be configured to determine a fourth number of bits to use to perform the fine quantization process based on the determined total number of bits and the third number of bits for the extended-range coarse quantization process in response to reallocating one or more of the determined second number of bits to the extended-range coarse quantization process. The audio encoder 24 may be further configured to determine a difference between the energy level of the first subband of frequency domain audio data and the quantized extended-range coarse energy level, and quantize the difference using the fine quantization process and the further number of bits to create a quantized fine energy level.

The audio encoder 24 may quantize the energy level of the first subband of frequency domain audio data using the extended-range coarse quantization process to produce a quantized extended-range coarse energy level (308). The audio encoder 24 may be configured to signal the quantized extended-range coarse energy level and the quantized fine energy level in an encoded audio bitstream.

In one example, the audio encoder 24 may be configured to generate a syntax element that indicates that the extended-range coarse quantization process is being used for the first subband of frequency domain audio data in response to determining that the energy level of the first subband of frequency domain audio data is outside the predetermined range of energy levels for the coarse quantization process. In another example, the audio encoder 24 may be configured to transmit the syntax element in an encoded audio bitstream. In another example, the audio encoder 24 may be configured to entropy encode the quantized extended-range coarse energy level. In another example, the audio encoder 24 may be configured to transmit the quantized extended-range coarse energy level over a PAN using a PAN communication protocol. In one example, the PAN communication protocol is a Bluetooth communication protocol.

Figure 13:
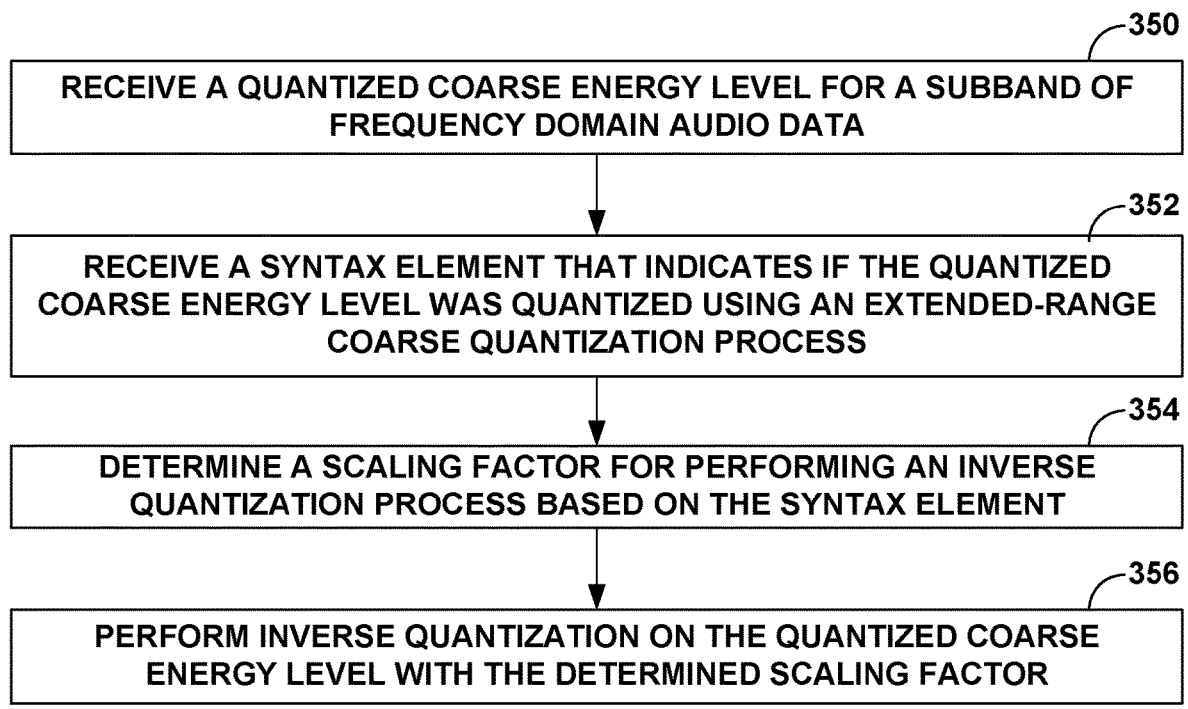
FIG. 13 is a flowchart illustrating example operation of the sink device of FIG. 1 in performing various aspects of the techniques described in this disclosure.

FIG. 13 is a flowchart illustrating example operation of the sink device 14 of FIG. 1 in performing various aspects of the techniques described in this disclosure. As shown in the example of FIG. 13, the audio decoder 44 of the sink device 14 may be configured to decode audio data in accordance with the techniques of this disclosure.

The audio decoder 44 may be configured to receive a quantized coarse energy level for a subband of frequency domain audio data (350) and receive a syntax element that indicates if the quantized coarse energy level was quantized using an extended-range coarse quantization process (352). The audio decoder 44 may be configured to determine a scaling factor for performing an inverse quantization process based on the syntax element (354).

For example, the audio decoder 44 may be configured to determine a first scaling factor if the syntax element indicates that an extended-range coarse quantization process is not used. The audio decoder 44 may be configured to determine a second, different scaling factor if the syntax element indicates that an extended-range coarse quantization process is used. The different first and second scaling factors may be based on the difference between the predetermined range of energy values used for a regular coarse quantization process and the extend range of energy values used for the extended-range coarse quantization process. The audio decoder 44 may then perform inverse quantization on the quantized coarse energy level with the determined scaling factor (356).

For example, audio decoder 44 may be configured to determine a first scaling factor based on a predetermined range of energy levels for a coarse quantization process in the case that the syntax element indicates that the coarse energy level was not quantized using the extended-range coarse quantization process, and determine a second scaling factor based on an extended range of energy levels, wherein the extended range of energy levels is larger than the predetermined range of energy levels for the coarse quantization process, in the case that the syntax element indicates that the coarse energy level was quantized using the extended-range coarse quantization process. Audio decoder 44 may be further configured to determine the extended range of energy levels for the extended-range coarse quantization process based on a frequency range of the subband of frequency domain audio data.

Audio decoder 44 may be further configured to receive a quantized fine energy level for the subband of frequency domain audio data, perform inverse quantization on the quantized fine energy level based on the syntax element, and add the inverse quantized coarse energy level to the inverse quantized fine energy level to determine an energy level for the subband of frequency domain audio data. Audio decoder 44 may then reconstruct decoded audio data using the energy level for the subband of frequency domain audio data, as described above with reference to FIG. 8.

Figure 14:
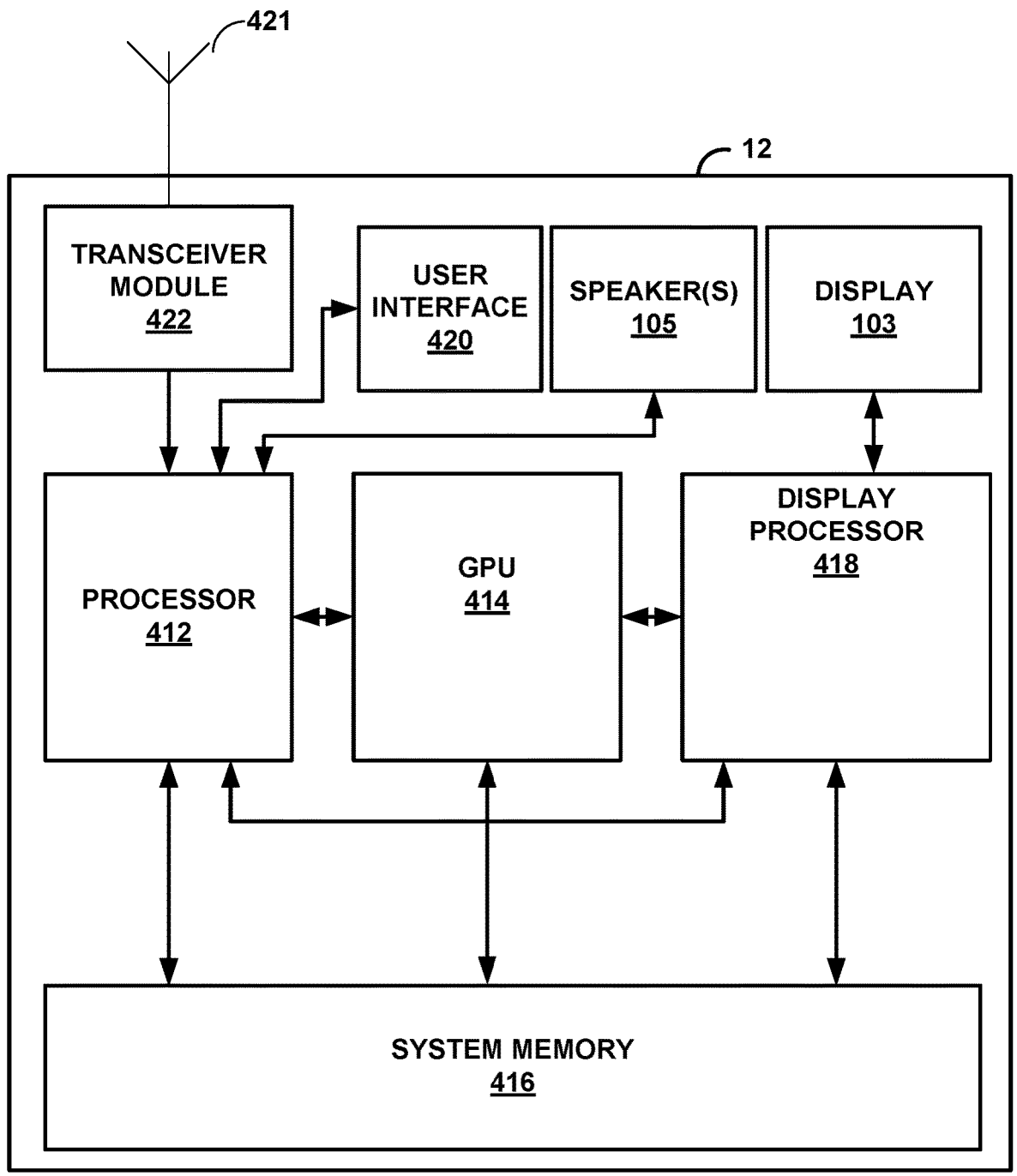
FIG. 14 is a block diagram illustrating example components of the source device shown in the example of FIG. 1.

FIG. 14 is a block diagram illustrating example components of the source device 12 shown in the example of FIG. 1. In the example of FIG. 14, the source device 12 includes a processor 412, a graphics processing unit (GPU) 414, system memory 416, a display processor 418, one or more integrated speakers 105, a display 103, a user interface 420, antenna 421, and a transceiver module 422. In examples where the source device 12 is a mobile device, the display processor 418 is a mobile display processor (MDP). In some examples, such as examples where the source device 12 is a mobile device, the processor 412, the GPU 414, and the display processor 418 may be formed as an integrated circuit (IC).

For example, the IC may be considered as a processing chip within a chip package and may be a system-on-chip (SoC). In some examples, two of the processors 412, the GPU 414, and the display processor 418 may be housed together in the same IC and the other in a different integrated circuit (i.e., different chip packages) or all three may be housed in different ICs or on the same IC. However, it may be possible that the processor 412, the GPU 414, and the display processor 418 are all housed in different integrated circuits in examples where the source device 12 is a mobile device.

Examples of the processor 412, the GPU 414, and the display processor 418 include, but are not limited to, one or more digital signal processors (DSPs), general purpose microprocessors, application specific integrated circuits (ASICs), field programmable logic arrays (FPGAs), or other equivalent integrated or discrete logic circuitry. The processor 412 may be the central processing unit (CPU) of the source device 12. In some examples, the GPU 414 may be specialized hardware that includes integrated and/or discrete logic circuitry that provides the GPU 414 with massive parallel processing capabilities suitable for graphics processing. In some instances, GPU 414 may also include general purpose processing capabilities, and may be referred to as a general-purpose GPU (GPGPU) when implementing general purpose processing tasks (i.e., non-graphics related tasks). The display processor 418 may also be specialized integrated circuit hardware that is designed to retrieve image content from the system memory 416, compose the image content into an image frame, and output the image frame to the display 103.

The processor 412 may execute various types of the applications 20. Examples of the applications 20 include web browsers, e-mail applications, spreadsheets, video games, other applications that generate viewable objects for display, or any of the application types listed in more detail above. The system memory 416 may store instructions for execution of the applications 20. The execution of one of the applications 20 on the processor 412 causes the processor 412 to produce graphics data for image content that is to be displayed and the audio data 21 that is to be played (possibly via integrated speaker 105). The processor 412 may transmit graphics data of the image content to the GPU 414 for further processing based on and instructions or commands that the processor 412 transmits to the GPU 414.

The processor 412 may communicate with the GPU 414 in accordance with a particular application processing interface (API). Examples of such APIs include the DirectX® API by Microsoft®, the OpenGL® or OpenGL ES® by the Khronos group, and the OpenCL®; however, aspects of this disclosure are not limited to the DirectX, the OpenGL, or the OpenCL APIs, and may be extended to other types of APIs. Moreover, the techniques described in this disclosure are not required to function in accordance with an API, and the processor 412 and the GPU 414 may utilize any technique for communication.

The system memory 416 may be the memory for the source device 12. The system memory 416 may comprise one or more computer-readable storage media. Examples of the system memory 416 include, but are not limited to, a random-access memory (RAM), an electrically erasable programmable read-only memory (EEPROM), flash memory, or other medium that can be used to carry or store desired program code in the form of instructions and/or data structures and that can be accessed by a computer or a processor.

In some examples, the system memory 416 may include instructions that cause the processor 412, the GPU 414, and/or the display processor 418 to perform the functions ascribed in this disclosure to the processor 412, the GPU 414, and/or the display processor 418. Accordingly, the system memory 416 may be a computer-readable storage medium having instructions stored thereon that, when executed, cause one or more processors (e.g., the processor 412, the GPU 414, and/or the display processor 418) to perform various functions.

The system memory 416 may include a non-transitory storage medium. The term "non-transitory" indicates that the storage medium is not embodied in a carrier wave or a propagated signal. However, the term "non-transitory" should not be interpreted to mean that the system memory 416 is non-movable or that its contents are static. As one example, the system memory 416 may be removed from the source device 12 and moved to another device. As another example, memory, substantially similar to the system memory 416, may be inserted into the source device 12. In certain examples, a non-transitory storage medium may store data that can, over time, change (e.g., in RAM).

The user interface 420 may represent one or more hardware or virtual (meaning a combination of hardware and software) user interfaces by which a user may interface with the source device 12. The user interface 420 may include physical buttons, switches, toggles, lights or virtual versions thereof. The user interface 420 may also include physical or virtual keyboards, touch interfaces—such as a touchscreen, haptic feedback, and the like.

The processor 412 may include one or more hardware units (including so-called "processing cores") configured to perform all or some portion of the operations discussed above with respect to one or more of the mixing unit 22, the audio encoder 24, the wireless connection manager 26, and the wireless communication units 30. The antenna 421 and the transceiver module 422 may represent a unit configured to establish and maintain the wireless connection between the source device 12 and the sink device 14. The antenna 421 and the transceiver module 422 may represent one or more receivers and one or more transmitters capable of wireless communication in accordance with one or more wireless communication protocols. The antenna 421 and the transceiver 422 may be configured to receive encoded audio data that has been encoded according to the techniques of this disclosure. Likewise, the antenna 421 and the transceiver 422 may be configured to transmit encoded audio data that has been encoded according to the techniques of this disclosure. The transceiver module 422 may perform all or some portion of the operations of one or more of the wireless connection manager 26 and the wireless communication units 30.

Figure 15:
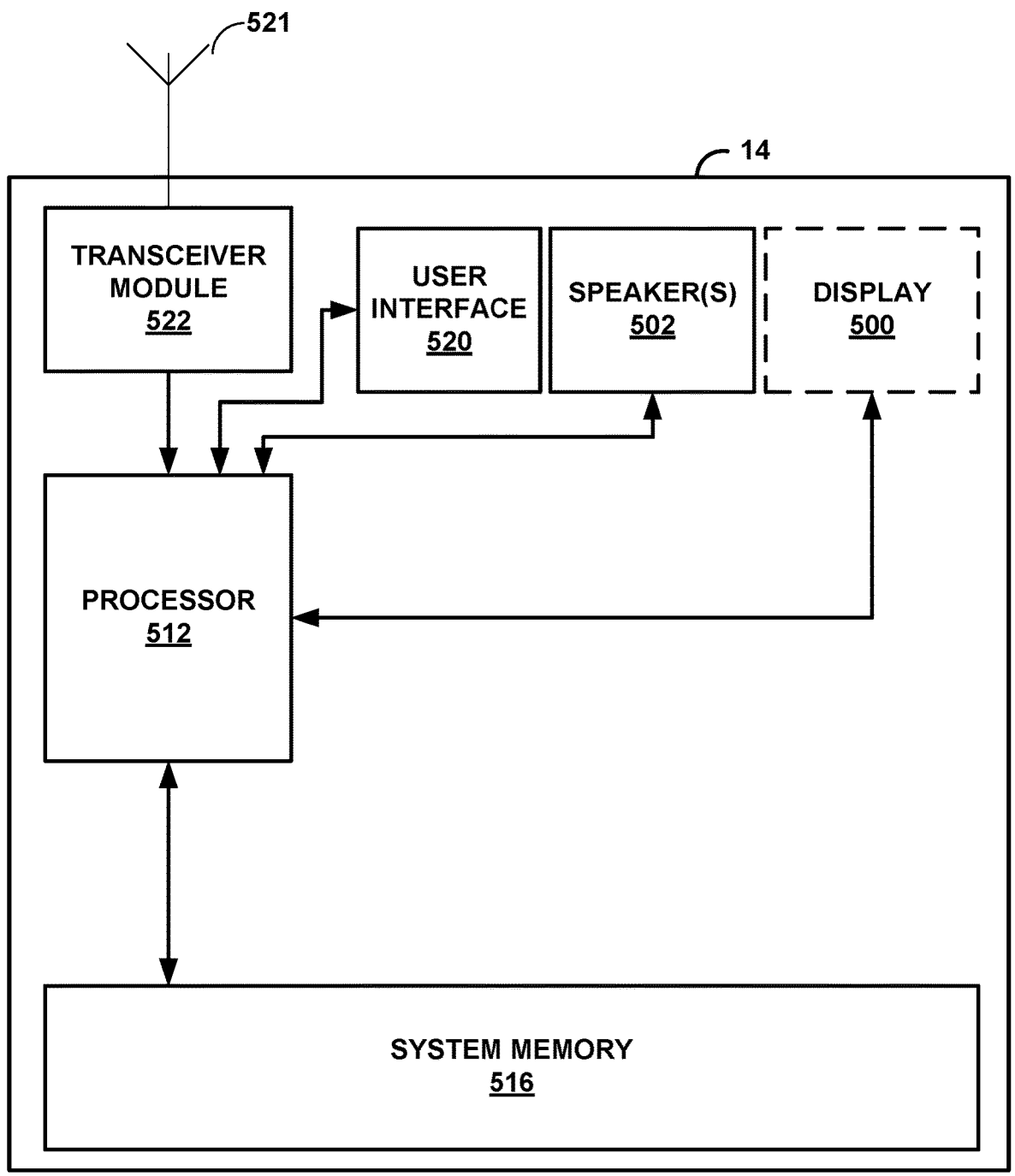
FIG. 15 is a block diagram illustrating exemplary components of the sink device shown in the example of FIG. 1.

FIG. 15 is a block diagram illustrating exemplary components of the sink device 14 shown in the example of FIG. 1. Although the sink device 14 may include components similar to that of the source device 12 discussed above in more detail with respect to the example of FIG. 14, the sink device 14 may, in certain instances, include only a subset of the components discussed above with respect to the source device 12.

In the example of FIG. 15, the sink device 14 includes one or more speakers 502, a processor 512, a system memory 516, a user interface 520, an antenna 521, and a transceiver module 522. The processor 512 may be similar or substantially similar to the processor 412. In some instances, the processor 512 may differ from the processor 412 in terms of total processing capacity or may be tailored for low power consumption. The system memory 516 may be similar or substantially similar to the system memory 416. The speakers 502, the user interface 520, the antenna 521, and the transceiver module 522 may be similar to or substantially similar to the respective speakers 402, user interface 420, and transceiver module 422. The sink device 14 may also optionally include a display 500, although the display 500 may represent a low power, low resolution (potentially a black and white LED) display by which to communicate limited information, which may be driven directly by the processor 512.

The processor 512 may include one or more hardware units (including so-called "processing cores") configured to perform all or some portion of the operations discussed above with respect to one or more of the wireless connection manager 40, the wireless communication units 42, and the audio decoder 44. The antenna 521 and the transceiver module 522 may represent a unit configured to establish and maintain the wireless connection between the source device 12 and the sink device 14. The antenna 521 and the transceiver module 522 may represent one or more receivers and one or more transmitters capable of wireless communication in accordance with one or more wireless communication protocols. The antenna 521 and the transceiver 522 may be configured to receive encoded audio data that has been encoded according to the techniques of this disclosure. Likewise, the antenna 521 and the transceiver 522 may be configured to transmit encoded audio data that has been encoded according to the techniques of this disclosure. The transceiver module 522 may perform all or some portion of the operations of one or more of the wireless connection manager 40 and the wireless communication units 28.

The foregoing techniques may be performed with respect to any number of different contexts and audio ecosystems. A number of example contexts are described below, although the techniques should be limited to the example contexts.

One example audio ecosystem may include audio content, movie studios, music studios, gaming audio studios, channel-based audio content, coding engines, game audio stems, game audio coding/rendering engines, and delivery systems.

The movie studios, the music studios, and the gaming audio studios may receive audio content. In some examples, the audio content may represent the output of an acquisition. The movie studios may output channel-based audio content (e.g., in 2.0, 5.1, and 7.1) such as by using a digital audio workstation (DAW). The music studios may output channel-based audio content (e.g., in 2.0, and 5.1) such as by using a DAW. In either case, the coding engines may receive and encode the channel-based audio content based one or more codecs (e.g., AAC, AC3, Dolby True HD, Dolby Digital Plus, and DTS Master Audio) for output by the delivery systems. The gaming audio studios may output one or more game audio stems, such as by using a DAW. The game audio coding/rendering engines may code and or render the audio stems into channel-based audio content for output by the delivery systems. Another example context in which the techniques may be performed comprises an audio ecosystem that may include broadcast recording audio objects, professional audio systems, consumer on-device capture, high-order ambisonics (HOA) audio format, on-device rendering, consumer audio, TV, and accessories, and car audio systems.

The broadcast recording audio objects, the professional audio systems, and the consumer on-device capture may all code their output using HOA audio format. In this way, the audio content may be coded using the HOA audio format into a single representation that may be played back using the on-device rendering, the consumer audio, TV, and accessories, and the car audio systems. In other words, the single representation of the audio content may be played back at a generic audio playback system (i.e., as opposed to requiring a particular configuration such as 5.1, 7.1, etc.), such as audio playback system 16.

Other examples of context in which the techniques may be performed include an audio ecosystem that may include acquisition elements, and playback elements. The acquisition elements may include wired and/or wireless acquisition devices (e.g., microphones), on-device surround sound capture, and mobile devices (e.g., smartphones and tablets). In some examples, wired and/or wireless acquisition devices may be coupled to mobile device via wired and/or wireless communication channel(s).

In accordance with one or more techniques of this disclosure, the mobile device may be used to acquire a soundfield. For instance, the mobile device may acquire a soundfield via the wired and/or wireless acquisition devices and/or the on-device surround sound capture (e.g., a plurality of microphones integrated into the mobile device). The mobile device may then code the acquired soundfield into various representations for playback by one or more of the playback elements. For instance, a user of the mobile device may record (acquire a soundfield of) a live event (e.g., a meeting, a conference, a play, a concert, etc.), and code the recording into various representation, including higher order ambisonic HOA representations.

The mobile device may also utilize one or more of the playback elements to playback the coded soundfield. For instance, the mobile device may decode the coded soundfield and output a signal to one or more of the playback elements that causes the one or more of the playback elements to recreate the soundfield. As one example, the mobile device may utilize the wireless and/or wireless communication channels to output the signal to one or more speakers (e.g., speaker arrays, sound bars, etc.). As another example, the mobile device may utilize docking solutions to output the signal to one or more docking stations and/or one or more docked speakers (e.g., sound systems in smart cars and/or homes). As another example, the mobile device may utilize headphone rendering to output the signal to a headset or headphones, e.g., to create realistic binaural sound.

In some examples, a particular mobile device may both acquire a soundfield and playback the same soundfield at a later time. In some examples, the mobile device may acquire a soundfield, encode the soundfield, and transmit the encoded soundfield to one or more other devices (e.g., other mobile devices and/or other non-mobile devices) for playback.

Yet another context in which the techniques may be performed includes an audio ecosystem that may include audio content, game studios, coded audio content, rendering engines, and delivery systems. In some examples, the game studios may include one or more DAWs which may support editing of audio signals. For instance, the one or more DAWs may include audio plugins and/or tools which may be configured to operate with (e.g., work with) one or more game audio systems. In some examples, the game studios may output new stem formats that support audio format. In any case, the game studios may output coded audio content to the rendering engines which may render a soundfield for playback by the delivery systems.

The mobile device may also, in some instances, include a plurality of microphones that are collectively configured to record a soundfield, including 3D soundfields. In other words, the plurality of microphone may have X, Y, Z diversity. In some examples, the mobile device may include a microphone which may be rotated to provide X, Y, Z diversity with respect to one or more other microphones of the mobile device.

A ruggedized video capture device may further be configured to record a soundfield. In some examples, the ruggedized video capture device may be attached to a helmet of a user engaged in an activity. For instance, the ruggedized video capture device may be attached to a helmet of a user whitewater rafting. In this way, the ruggedized video capture device may capture a soundfield that represents the action all around the user (e.g., water crashing behind the user, another rafter speaking in front of the user, etc.).

The techniques may also be performed with respect to an accessory enhanced mobile device, which may be configured to record a soundfield, including a 3D soundfield. In some examples, the mobile device may be similar to the mobile devices discussed above, with the addition of one or more accessories. For instance, a microphone, including an Eigen microphone, may be attached to the above noted mobile device to form an accessory enhanced mobile device. In this way, the accessory enhanced mobile device may capture a higher quality version of the soundfield than just using sound capture components integral to the accessory enhanced mobile device.

Example audio playback devices that may perform various aspects of the techniques described in this disclosure are further discussed below. In accordance with one or more techniques of this disclosure, speakers and/or sound bars may be arranged in any arbitrary configuration while still playing back a soundfield, including a 3D soundfield. Moreover, in some examples, headphone playback devices may be coupled to a decoder via either a wired or a wireless connection. In accordance with one or more techniques of this disclosure, a single generic representation of a soundfield may be utilized to render the soundfield on any combination of the speakers, the sound bars, and the headphone playback devices.

A number of different example audio playback environments may also be suitable for performing various aspects of the techniques described in this disclosure. For instance, a 5.1 speaker playback environment, a 2.0 (e.g., stereo) speaker playback environment, a 9.1 speaker playback environment with full height front loudspeakers, a 22.2 speaker playback environment, a 16.0 speaker playback environment, an automotive speaker playback environment, and a mobile device with ear bud playback environment may be suitable environments for performing various aspects of the techniques described in this disclosure.

In accordance with one or more techniques of this disclosure, a single generic representation of a soundfield may be utilized to render the soundfield on any of the foregoing playback environments. Additionally, the techniques of this disclosure enable a rendered to render a soundfield from a generic representation for playback on the playback environments other than that described above. For instance, if design considerations prohibit proper placement of speakers according to a 7.1 speaker playback environment (e.g., if it is not possible to place a right surround speaker), the techniques of this disclosure enable a render to compensate with the other 6 speakers such that playback may be achieved on a 6.1 speaker playback environment.

Moreover, a user may watch a sports game while wearing headphones. In accordance with one or more techniques of this disclosure, the soundfield, including 3D soundfields, of the sports game may be acquired (e.g., one or more microphones and/or Eigen microphones may be placed in and/or around the baseball stadium). HOA coefficients corresponding to the 3D soundfield may be obtained and transmitted to a decoder, the decoder may reconstruct the 3D soundfield based on the HOA coefficients and output the reconstructed 3D soundfield to a renderer, the renderer may obtain an indication as to the type of playback environment (e.g., headphones), and render the reconstructed 3D soundfield into signals that cause the headphones to output a representation of the 3D soundfield of the sports game.

In each of the various instances described above, it should be understood that the source device 12 may perform a method or otherwise comprise means to perform each step of the method for which the source device 12 is described above as performing. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the source device 12 has been configured to perform.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media. Data storage media may be any available media that can be accessed by one or more computers or one or more processors to retrieve instructions, code and/or data structures for implementation of the techniques described in this disclosure. A computer program product may include a computer-readable medium.

Likewise, in each of the various instances described above, it should be understood that the sink device 14 may perform a method or otherwise comprise means to perform each step of the method for which the sink device 14 is configured to perform. In some instances, the means may comprise one or more processors. In some instances, the one or more processors may represent a special purpose processor configured by way of instructions stored to a non-transitory computer-readable storage medium. In other words, various aspects of the techniques in each of the sets of encoding examples may provide for a non-transitory computer-readable storage medium having stored thereon instructions that, when executed, cause the one or more processors to perform the method for which the sink device 14 has been configured to perform.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the techniques have been described. These and other aspects of the techniques are within the scope of the following claims.

What is claimed is:

1. An apparatus configured to decode audio data, the apparatus comprising:

a memory configured to store the audio data; and
one or more processors in communication with the memory, the one or more processors configured to:
   receive a quantized coarse energy level for a subband of frequency domain audio data;
   receive a syntax element that indicates if the quantized coarse energy level was quantized using an extended-range coarse quantization process;
   determine a scaling factor for performing an inverse quantization process based on the syntax element, wherein to determine the scaling factor, the one or more processors are further configured to:
      determine the scaling factor based on a predetermined range of energy levels for a coarse quantization process in the case that the syntax element indicates that the coarse energy level was not quantized using the extended-range coarse quantization process, and
      determine the scaling factor based on an extended range of energy levels, wherein the extended range of energy levels is larger than the predetermined range of energy levels for the coarse quantization process, in the case that the syntax element indicates that the coarse energy level was quantized using the extended-range coarse quantization process; and
   perform inverse quantization on the quantized coarse energy level with the determined scaling factor.

2. The apparatus of claim 1, wherein the one or more processors are further configured to:
   determine the extended range of energy levels for the extended-range coarse quantization process based on a frequency range of the subband of frequency domain audio data.

3. The apparatus of claim 1, wherein the one or more processors are further configured to:
   receive a quantized fine energy level for the subband of frequency domain audio data;
   perform inverse quantization on the quantized fine energy level based on the syntax element;
   add the inverse quantized coarse energy level to the inverse quantized fine energy level to determine an energy level for the subband of frequency domain audio data; and
   reconstruct decoded audio data using the energy level for the subband of frequency domain audio data.

4. The apparatus of claim 3, further comprising:
   an antenna configured to receive the quantized coarse energy level and the quantized fine energy level over a personal area network (PAN) using a PAN communication protocol; and
   one or more loudspeakers configured to output the decoded audio data.

5. A method for decoding audio data, the method comprising:
   receiving a quantized coarse energy level for a subband of frequency domain audio data;
   receiving a syntax element that indicates if the quantized coarse energy level was quantized using an extended-range coarse quantization process;
   determining a scaling factor for performing an inverse quantization process based on the syntax element, wherein determining the scaling factor comprises:
      determining the scaling factor based on a predetermined range of energy levels for a coarse quantization process in the case that the syntax element indicates that the coarse energy level was not quantized using the extended-range coarse quantization process, and
      determining the scaling factor based on an extended range of energy levels, wherein the extended range of energy levels is larger than the predetermined range of energy levels for the coarse quantization process, in the case that the syntax element indicates that the coarse energy level was quantized using the extended-range coarse quantization process; and
   performing inverse quantization on the quantized coarse energy level with the determined scaling factor.

6. The method of claim 5, further comprising:
   determining the extended range of energy levels for the extended-range coarse quantization process based on a frequency range of the subband of frequency domain audio data.

7. The method of claim 5, further comprising:
   receiving a quantized fine energy level for the subband of frequency domain audio data;
   performing inverse quantization on the quantized fine energy level based on the syntax element;
   adding the inverse quantized coarse energy level to the inverse quantized fine energy level to determine an energy level for the subband of frequency domain audio data; and
   reconstructing decoded audio data using the energy level for the subband of frequency domain audio data.

8. The method of claim 7, further comprising:
   receiving the quantized coarse energy level and the quantized fine energy level over a personal area network (PAN) using a PAN communication protocol; and
   outputting the decoded audio data.

9. An apparatus configured to encode audio data, the apparatus comprising:
   a memory configured to store the audio data; and
   one or more processors in communication with the memory, the one or more processors configured to:
      determine an energy level of a first subband of frequency domain audio data;
      determine a bit allocation for a coarse quantization process and a fine quantization process;
      determine that the energy level of the first subband of frequency domain audio data is outside a predetermined range of energy levels for the coarse quantization process;
      reallocate bits assigned to the fine quantization process to an extended-range coarse quantization process, the extended-range coarse quantization process using an extended range of energy levels, wherein the extended range of energy levels is larger than the predetermined range of energy levels for the coarse quantization process; and
      quantize the energy level of the first subband of frequency domain audio data using the extended-range coarse quantization process to produce a quantized extended-range coarse energy level.

10. The apparatus of claim 9, wherein the one or more processors are further configured to:
   quantize the energy level of the first subband of frequency domain audio data using the coarse quantization process to create a quantized coarse energy level,
   wherein to determine that the energy level of the first subband of frequency domain audio data is outside the predetermined range of energy levels, the one or more processors are further configured to determine that the quantized coarse energy level is outside the predetermined range of energy levels.

11. The apparatus of claim 9, wherein to determine the bit allocation for the coarse quantization process and the fine quantization process, the one or more processors are further configured to:
    determine a total number of bits to use to quantize the energy level of the first subband of frequency domain audio;
    determine a first number of bits to use to perform the coarse quantization process; and
    determine a second number of bits to use to perform the fine quantization process based on the determined total number of bits and the determined first number of bits.

12. The apparatus of claim 11, wherein to reallocate bits assigned to the fine quantization process to the extended-range coarse quantization process, the one or more processors are further configured to:
    reallocate one or more of the determined second number of bits to the extended-range coarse quantization process, wherein the extended-range coarse quantization process uses a third number of bits.

13. The apparatus of claim 12, wherein the one or more processors are further configured to:
    determine a fourth number of bits to use to perform the fine quantization process based on the determined total number of bits and the third number of bits for the extended-range coarse quantization process in response to reallocating one or more of the determined second number of bits to the extended-range coarse quantization process.

14. The apparatus of claim 13, the apparatus further comprising:
    a microphone configured to capture the audio data,
    wherein the one or more processors are further configured to:
    determine a difference between the energy level of the first subband of frequency domain audio data and the quantized extended-range coarse energy level; and
    quantize the difference using the fine quantization process and the further number of bits to create a quantized fine energy level.

15. The apparatus of claim 9, wherein the one or more processors are further configured to:
    determine the extended range of energy levels for the extended-range coarse quantization process based on a frequency range of the first subband of frequency domain audio data.

16. The apparatus of claim 9, wherein the one or more processors are further configured to:
    perform a frequency domain transformation on the audio data to create frequency domain audio data; and
    filter the frequency domain audio data into a plurality of subbands of frequency domain audio data, the plurality of subbands of frequency domain audio data including the first subband of frequency domain audio data.

17. The apparatus of claim 9, wherein the one or more processors are further configured to:
    generate a syntax element that indicates that the extended-range coarse quantization process is being used for the first subband of frequency domain audio data in response to determining that the energy level of the first subband of frequency domain audio data is outside the predetermined range of energy levels for the coarse quantization process.

18. The apparatus of claim 9, further comprising:
    a transmitter configured to transmit the quantized extended-range coarse energy level over a personal area network (PAN) using a PAN communication protocol.

19. A method of encoding audio data, the method comprising:
    determining an energy level of a first subband of frequency domain audio data;
    determining a bit allocation for a coarse quantization process and a fine quantization process;
    determining that the energy level of the first subband of frequency domain audio data is outside a predetermined range of energy levels for the coarse quantization process;
    reallocating bits assigned to the fine quantization process to an extended-range coarse quantization process, the extended-range coarse quantization process using an extended range of energy levels, wherein the extended range of energy levels is larger than the predetermined range of energy levels for the coarse quantization process; and
    quantizing the energy level of the first subband of frequency domain audio data using the extended-range coarse quantization process to produce a quantized extended-range coarse energy level.

20. The method of claim 19, further comprising:
    quantizing the energy level of the first subband of frequency domain audio data using the coarse quantization process to create a quantized coarse energy level,
    wherein determining that the energy level of the first subband of frequency domain audio data is outside the predetermined range of energy levels comprises determining that the quantized coarse energy level is outside the predetermined range of energy levels.

21. The method of claim 19, wherein determining the bit allocation for the coarse quantization process and the fine quantization process comprises:
    determining a total number of bits to use to quantize the energy level of the first subband of frequency domain audio;
    determining a first number of bits to use to perform the coarse quantization process; and
    determining a second number of bits to use to perform the fine quantization process based on the determined total number of bits and the determined first number of bits.

22. The method of claim 21, wherein reallocating bits assigned to the fine quantization process to the extended-range coarse quantization process comprises:
    reallocating one or more of the determined second number of bits to the extended-range coarse quantization process, wherein the extended-range coarse quantization process uses a third number of bits.

23. The method of claim 22, further comprising:
    in response to reallocating one or more of the determined second number of bits to the extended-range coarse quantization process, determining a fourth number of bits to use to perform the fine quantization process based on the determined total number of bits and the third number of bits for the extended-range coarse quantization process.

24. The method of claim 23, further comprising:
    determining a difference between the energy level of the first subband of frequency domain audio data and the quantized extended-range coarse energy level; and quantizing the difference using the fine quantization process and the further number of bits to create a quantized fine energy level.

25. The method of claim 19, further comprising:
determining the extended range of energy levels for the extended-range coarse quantization process based on a frequency range of the first subband of frequency domain audio data.

26. The method of claim 19, further comprising:
performing a frequency domain transformation on the audio data to create frequency domain audio data; and
filtering the frequency domain audio data into a plurality of subbands of frequency domain audio data, the plurality of subbands of frequency domain audio data including the first subband of frequency domain audio data.

27. The method of claim 19, further comprising:
in response to determining that the energy level of the first subband of frequency domain audio data is outside the predetermined range of energy levels for the coarse quantization process, generating a syntax element that indicates that the extended-range coarse quantization process is being used for the first subband of frequency domain audio data.

28. The method of claim 19, further comprising:
transmitting the quantized extended-range coarse energy level over a personal area network (PAN) using a PAN communication protocol.

* * * * *